US008370887B2

(12) United States Patent
Virdi et al.

(10) Patent No.: US 8,370,887 B2
(45) Date of Patent: Feb. 5, 2013

(54) MEDIA STREAMING WITH ENHANCED SEEK OPERATION

(75) Inventors: Gurpratap Virdi, Bellevue, WA (US); Andres Vega-Garcia, Newcastle, WA (US); Wenbo Zhang, Redmond, WA (US); Eldar Musayev, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1217 days.

(21) Appl. No.: 12/188,087

(22) Filed: Aug. 7, 2008

(65) Prior Publication Data

US 2009/0297123 A1 Dec. 3, 2009

Related U.S. Application Data

(60) Provisional application No. 61/057,755, filed on May 30, 2008, provisional application No. 61/057,759, filed on May 30, 2008.

(51) Int. Cl.
*H04N 7/173* (2011.01)
(52) U.S. Cl. ............... 725/114; 725/88; 725/94; 725/78
(58) Field of Classification Search .................. 725/114, 725/88, 94, 78
See application file for complete search history.

(56) References Cited

U.S. PATENT DOCUMENTS

| 4,051,470 A | 9/1977 | Esteban et al. |
|---|---|---|
| 4,454,546 A | 6/1984 | Mori |
| 4,493,091 A | 1/1985 | Gundry |
| 4,706,260 A | 11/1987 | Fedele et al. |
| 4,802,224 A | 1/1989 | Shiraki et al. |
| 4,849,812 A | 7/1989 | Borgers et al. |
| 4,937,036 A | 6/1990 | Beard et al. |
| 4,954,892 A | 9/1990 | Asai et al. |
| 5,043,919 A | 8/1991 | Callaway et al. |
| 5,089,889 A | 2/1992 | Sugiyama |
| 5,091,782 A | 2/1992 | Krause et al. |
| 5,136,377 A | 8/1992 | Johnston et al. |
| 5,223,949 A | 6/1993 | Honjo |
| 5,235,618 A | 8/1993 | Sakai et al. |
| 5,258,836 A | 11/1993 | Murata |
| 5,262,964 A | 11/1993 | Bonsall et al. |
| 5,266,941 A | 11/1993 | Akeley et al. |
| 5,317,672 A | 5/1994 | Crossman et al. |

(Continued)

FOREIGN PATENT DOCUMENTS

| EP | 0397402 | 11/1990 |
|---|---|---|
| EP | 0526163 | 2/1993 |

(Continued)

OTHER PUBLICATIONS

Agarwal et al., "Optimal Buffering Policy for Downloading Music in Heterogeneous Wireless Networks," Wireless Communications and Networking Conference, vol. 1, pp. 337-341, Mar. 17-21, 2002.

(Continued)

*Primary Examiner* — Nasser Goodarzi
*Assistant Examiner* — Jivka Rabovianski
(74) *Attorney, Agent, or Firm* — Klarquist Sparkman, LLP

(57) ABSTRACT

The present disclosure relates to playback of video/audio streaming media data. The media stream is available from the network at multiple bit rates. When a seek operation is performed, a playback device requests a lower bit rate media stream in order to quickly fill a playback buffer so that playback can commence more readily. After a seek start-up period is complete, the playback device can return to downloading the media stream associated with higher bit rates in order to increase the quality of the playback.

18 Claims, 12 Drawing Sheets

U.S. PATENT DOCUMENTS

| | | |
|---|---|---|
| 5,335,299 A | 8/1994 | Atkinson |
| 5,394,170 A | 2/1995 | Akeley et al. |
| 5,398,069 A | 3/1995 | Huang et al. |
| 5,400,371 A | 3/1995 | Natarajan |
| 5,412,430 A | 5/1995 | Nagata |
| 5,414,796 A | 5/1995 | Jacobs et al. |
| RE34,965 E | 6/1995 | Sugiyama |
| 5,422,676 A | 6/1995 | Herpel et al. |
| 5,448,297 A | 9/1995 | Alattar et al. |
| 5,457,495 A | 10/1995 | Hartung |
| RE35,093 E | 11/1995 | Wang et al. |
| 5,467,086 A | 11/1995 | Jeong |
| 5,467,134 A | 11/1995 | Laney et al. |
| RE35,158 E | 2/1996 | Sugiyama |
| 5,533,052 A | 7/1996 | Bhaskar |
| 5,539,466 A | 7/1996 | Igarashi et al. |
| 5,570,363 A | 10/1996 | Holm |
| 5,579,430 A | 11/1996 | Grill et al. |
| 5,586,200 A | 12/1996 | Devaney et al. |
| 5,602,959 A | 2/1997 | Bergstrom et al. |
| 5,623,424 A | 4/1997 | Azadegan et al. |
| 5,627,938 A | 5/1997 | Johnston |
| 5,650,860 A | 7/1997 | Uz |
| 5,654,760 A | 8/1997 | Ohtsuki |
| 5,661,755 A | 8/1997 | Van De Kerkhof et al. |
| 5,666,161 A | 9/1997 | Kohiyama et al. |
| 5,666,461 A | 9/1997 | Igarashi et al. |
| 5,678,002 A | 10/1997 | Fawcett et al. |
| 5,686,964 A | 11/1997 | Tabatabai et al. |
| 5,699,476 A | 12/1997 | Van Der Meer |
| 5,701,164 A | 12/1997 | Kato et al. |
| 5,724,453 A | 3/1998 | Ratnakar et al. |
| 5,742,735 A | 4/1998 | Eberlein et al. |
| 5,745,738 A | 4/1998 | Ricard |
| 5,754,974 A | 5/1998 | Griffin et al. |
| 5,764,807 A | 6/1998 | Pearlman |
| 5,764,814 A | 6/1998 | Chen et al. |
| 5,787,203 A | 7/1998 | Lee et al. |
| 5,796,438 A | 8/1998 | Hosono |
| RE35,910 E | 9/1998 | Nagata et al. |
| 5,802,213 A | 9/1998 | Gardos |
| 5,819,215 A | 10/1998 | Dobson et al. |
| 5,825,310 A | 10/1998 | Tsutsui |
| 5,835,149 A | 11/1998 | Astle |
| 5,835,495 A | 11/1998 | Ferriere |
| 5,845,243 A | 12/1998 | Smart et al. |
| 5,867,230 A | 2/1999 | Wang et al. |
| 5,874,995 A | 2/1999 | Naimpally et al. |
| 5,884,039 A | 3/1999 | Ludwig et al. |
| 5,886,276 A | 3/1999 | Levine et al. |
| 5,903,892 A | 5/1999 | Hoffert et al. |
| 5,917,830 A | 6/1999 | Chen et al. |
| 5,926,226 A | 7/1999 | Proctor et al. |
| 5,933,451 A | 8/1999 | Ozkan et al. |
| 5,946,419 A | 8/1999 | Chen et al. |
| 5,949,489 A | 9/1999 | Nishikawa et al. |
| 5,952,943 A | 9/1999 | Walsh et al. |
| 5,963,258 A | 10/1999 | Nishikawa et al. |
| 5,970,173 A | 10/1999 | Lee et al. |
| 5,970,175 A | 10/1999 | Nishikawa et al. |
| 5,974,184 A | 10/1999 | Eifrig |
| 5,982,305 A | 11/1999 | Taylor |
| 5,986,712 A | 11/1999 | Peterson et al. |
| 5,987,376 A | 11/1999 | Olson et al. |
| 5,990,945 A | 11/1999 | Sinha et al. |
| 5,990,960 A | 11/1999 | Murakami et al. |
| 5,995,151 A | 11/1999 | Naveen et al. |
| 6,000,053 A | 12/1999 | Levine et al. |
| 6,002,439 A | 12/1999 | Murakami et al. |
| 6,006,241 A | 12/1999 | Purnaveja et al. |
| RE36,507 E | 1/2000 | Iu |
| 6,014,706 A | 1/2000 | Cannon et al. |
| 6,029,126 A | 2/2000 | Malvar |
| 6,040,863 A | 3/2000 | Kato |
| 6,041,345 A | 3/2000 | Levi et al. |
| 6,049,630 A | 4/2000 | Wang et al. |
| 6,058,362 A | 5/2000 | Malvar |
| 6,072,831 A | 6/2000 | Chen |
| 6,073,153 A | 6/2000 | Malvar |
| 6,075,768 A | 6/2000 | Mishra |
| 6,081,554 A | 6/2000 | Lee et al. |
| 6,088,392 A | 7/2000 | Rosenberg |
| RE36,822 E | 8/2000 | Sugiyama |
| 6,097,759 A | 8/2000 | Murakami et al. |
| 6,108,382 A | 8/2000 | Gringeri et al. |
| 6,111,914 A | 8/2000 | Bist |
| 6,115,689 A | 9/2000 | Malvar |
| 6,141,053 A | 10/2000 | Saukkonen |
| 6,154,495 A | 11/2000 | Yamaguchi et al. |
| 6,160,846 A | 12/2000 | Chiang et al. |
| 6,167,162 A | 12/2000 | Jacquin et al. |
| 6,182,034 B1 | 1/2001 | Malvar |
| 6,188,794 B1 | 2/2001 | Nishikawa et al. |
| 6,192,075 B1 | 2/2001 | Jeng |
| 6,208,761 B1 | 3/2001 | Passaggio et al. |
| 6,212,232 B1 | 4/2001 | Reed et al. |
| 6,215,820 B1 | 4/2001 | Bagni et al. |
| 6,223,162 B1 | 4/2001 | Chen et al. |
| 6,226,407 B1 | 5/2001 | Zabih et al. |
| 6,240,380 B1 | 5/2001 | Malvar |
| RE37,222 E | 6/2001 | Yonemitsu et al. |
| 6,243,497 B1 | 6/2001 | Chiang et al. |
| 6,259,739 B1 | 7/2001 | Kondo |
| 6,259,810 B1 | 7/2001 | Gill et al. |
| 6,275,531 B1 | 8/2001 | Li |
| 6,278,735 B1 | 8/2001 | Mohsenian |
| 6,292,585 B1 | 9/2001 | Yamaguchi et al. |
| 6,304,928 B1 | 10/2001 | Mairs et al. |
| 6,307,973 B2 | 10/2001 | Nishikawa et al. |
| 6,311,209 B1 | 10/2001 | Olson et al. |
| 6,320,825 B1 | 11/2001 | Bruekers et al. |
| 6,324,216 B1 | 11/2001 | Igarashi et al. |
| 6,332,003 B1 | 12/2001 | Matsuura |
| 6,339,794 B2 | 1/2002 | Bolosky et al. |
| 6,351,226 B1 | 2/2002 | Saunders et al. |
| 6,370,502 B1 | 4/2002 | Wu et al. |
| 6,404,813 B1 | 6/2002 | Haskell et al. |
| 6,421,738 B1 | 7/2002 | Ratan et al. |
| 6,421,739 B1 | 7/2002 | Holiday |
| 6,441,754 B1 | 8/2002 | Wang et al. |
| 6,466,987 B2 | 10/2002 | Bolosky et al. |
| 6,473,409 B1 | 10/2002 | Malvar |
| 6,490,554 B2 | 12/2002 | Endo et al. |
| 6,493,388 B1 | 12/2002 | Wang |
| 6,496,601 B1 | 12/2002 | Migdal et al. |
| 6,501,797 B1 | 12/2002 | van der Schaar et al. |
| 6,501,798 B1 | 12/2002 | Sivan |
| 6,522,693 B1 | 2/2003 | Lu et al. |
| 6,539,124 B2 | 3/2003 | Sethuraman et al. |
| 6,560,636 B2 | 5/2003 | Cohen et al. |
| 6,573,905 B1 | 6/2003 | MacInnis et al. |
| 6,573,915 B1 | 6/2003 | Sivan et al. |
| 6,574,593 B1 | 6/2003 | Gao et al. |
| 6,614,442 B1 | 9/2003 | Ouyang et al. |
| 6,625,321 B1 | 9/2003 | Li et al. |
| 6,628,712 B1 | 9/2003 | Le Maguet |
| 6,646,195 B1 | 11/2003 | Puryear |
| 6,654,417 B1 | 11/2003 | Hui |
| 6,654,419 B1 | 11/2003 | Sriram et al. |
| 6,654,790 B2 | 11/2003 | Ogle et al. |
| 6,675,199 B1 | 1/2004 | Mohammed et al. |
| 6,683,987 B1 | 1/2004 | Sugahara |
| 6,697,072 B2 | 2/2004 | Russell et al. |
| 6,704,813 B2 | 3/2004 | Smirnov et al. |
| 6,728,317 B1 | 4/2004 | Demos |
| 6,732,071 B2 | 5/2004 | Lopez-Estrada et al. |
| 6,745,364 B2 | 6/2004 | Bhatt et al. |
| 6,754,715 B1 | 6/2004 | Cannon et al. |
| 6,760,482 B1 | 7/2004 | Taubman |
| 6,760,598 B1 | 7/2004 | Kurjenniemi |
| 6,763,374 B1 | 7/2004 | Levi et al. |
| 6,785,331 B1 | 8/2004 | Jozawa et al. |
| 6,789,123 B2 | 9/2004 | Li et al. |
| 6,792,449 B2 | 9/2004 | Colville et al. |
| 6,798,364 B2 | 9/2004 | Chen et al. |
| 6,801,947 B1 | 10/2004 | Li |
| 6,810,083 B2 | 10/2004 | Chen et al. |

| Patent No. | Date | Name |
|---|---|---|
| 6,819,714 B2 | 11/2004 | Yamada et al. |
| 6,836,791 B1 | 12/2004 | Levi et al. |
| 6,862,402 B2 | 3/2005 | Kim |
| 6,876,703 B2 | 4/2005 | Ismaeil et al. |
| 6,885,471 B1 | 4/2005 | Minowa et al. |
| 6,895,050 B2 | 5/2005 | Lee |
| 6,934,677 B2 | 8/2005 | Chen et al. |
| 6,937,770 B1 | 8/2005 | Oguz et al. |
| 6,961,631 B1 | 11/2005 | Puryear |
| 6,968,364 B1 | 11/2005 | Wong et al. |
| 6,974,901 B2 | 12/2005 | Puryear |
| 6,980,695 B2 | 12/2005 | Mehrotra |
| 7,016,409 B2 | 3/2006 | Unger |
| 7,023,915 B2 | 4/2006 | Pian |
| 7,027,982 B2 | 4/2006 | Chen et al. |
| 7,031,700 B1 | 4/2006 | Weaver et al. |
| 7,046,805 B2 | 5/2006 | Fitzhardinge et al. |
| 7,054,365 B2 | 5/2006 | Kim et al. |
| 7,054,774 B2 | 5/2006 | Batterberry et al. |
| 7,072,973 B1 | 7/2006 | Newson et al. |
| 7,107,606 B2 | 9/2006 | Lee |
| 7,111,044 B2 | 9/2006 | Lee |
| 7,124,164 B1 | 10/2006 | Chemtob |
| 7,143,030 B2 | 11/2006 | Chen et al. |
| 7,146,313 B2 | 12/2006 | Chen et al. |
| 7,149,247 B2 | 12/2006 | Sullivan |
| 7,151,749 B2 | 12/2006 | Vega-Garcia et al. |
| 7,162,533 B2 | 1/2007 | Klemets |
| 7,174,384 B2 | 2/2007 | Cheung |
| 7,174,385 B2 | 2/2007 | Li |
| 7,176,957 B2 | 2/2007 | Ivashin et al. |
| 7,177,642 B2 | 2/2007 | Sanchez Herrero et al. |
| 7,184,959 B2 | 2/2007 | Gibbon |
| 7,190,670 B2 | 3/2007 | Varsa et al. |
| 7,206,822 B2 | 4/2007 | Levi et al. |
| 7,206,854 B2 | 4/2007 | Kauffman et al. |
| 7,248,740 B2 | 7/2007 | Sullivan |
| 7,260,525 B2 | 8/2007 | Chen et al. |
| 7,263,482 B2 | 8/2007 | Chen et al. |
| 7,266,613 B1 | 9/2007 | Brown et al. |
| 7,283,881 B2 | 10/2007 | Puryear |
| 7,283,966 B2 | 10/2007 | Zhang et al. |
| 7,286,748 B2 | 10/2007 | Srinivasan et al. |
| 7,296,063 B2 | 11/2007 | Levi et al. |
| 7,302,490 B1 | 11/2007 | Gupta et al. |
| 7,313,236 B2 | 12/2007 | Amini et al. |
| 7,313,755 B2 | 12/2007 | Rahman et al. |
| 7,342,924 B2 | 3/2008 | Levi et al. |
| 7,343,291 B2 | 3/2008 | Thumpudi et al. |
| 7,346,007 B2 | 3/2008 | Curcio et al. |
| 7,348,483 B2 | 3/2008 | Puryear |
| 7,359,955 B2 | 4/2008 | Menon et al. |
| 7,360,230 B1 | 4/2008 | Paz et al. |
| 7,365,752 B2 | 4/2008 | Xie |
| 7,383,180 B2 | 6/2008 | Thumpudi et al. |
| 7,391,717 B2 | 6/2008 | Klemets et al. |
| 7,392,316 B2 | 6/2008 | Klemets et al. |
| 7,401,221 B2 | 7/2008 | Adent et al. |
| 7,409,145 B2 | 8/2008 | Antoun et al. |
| 7,424,730 B2 | 9/2008 | Chou |
| 7,433,746 B2 | 10/2008 | Puryear |
| 7,444,419 B2 | 10/2008 | Green |
| 7,451,229 B2 | 11/2008 | Klemets et al. |
| 7,466,721 B2 | 12/2008 | Levi et al. |
| 7,472,198 B2 | 12/2008 | Gupta et al. |
| 7,480,382 B2 | 1/2009 | Dunbar et al. |
| 7,483,532 B2 | 1/2009 | Alkove et al. |
| 7,492,769 B2 | 2/2009 | Klemets |
| 7,493,644 B1 | 2/2009 | Tanskanen |
| 7,505,485 B2 | 3/2009 | Sullivan et al. |
| 7,528,314 B2 | 5/2009 | Puryear |
| 7,529,541 B2 | 5/2009 | Cho et al. |
| 7,536,469 B2 | 5/2009 | Chou et al. |
| 7,538,267 B2 | 5/2009 | Puryear |
| 7,552,227 B2 | 6/2009 | Wang |
| 7,554,922 B2 | 6/2009 | Vega-Garcia et al. |
| 7,555,464 B2 | 6/2009 | Candelore |
| 7,558,472 B2 | 7/2009 | Locket et al. |
| 7,565,429 B1 | 7/2009 | Fernandez |
| 7,581,255 B2 | 8/2009 | Alkove et al. |
| 7,603,387 B2 | 10/2009 | Gates et al. |
| 7,631,015 B2 | 12/2009 | Gupta et al. |
| 7,631,039 B2 | 12/2009 | Eisenberg |
| 7,633,005 B2 | 12/2009 | Puryear |
| 7,644,172 B2 | 1/2010 | Stewart et al. |
| 7,663,049 B2 | 2/2010 | Puryear |
| 7,667,121 B2 | 2/2010 | Puryear |
| 7,672,743 B2 | 3/2010 | Messer et al. |
| 7,673,306 B2 | 3/2010 | Puryear |
| 7,673,315 B1 | 3/2010 | Wong et al. |
| 7,676,495 B2 | 3/2010 | Qian |
| 7,684,566 B2 | 3/2010 | Oliveira et al. |
| 7,720,908 B1 | 5/2010 | Newson et al. |
| 7,725,557 B2 | 5/2010 | Klemets et al. |
| 7,761,609 B1 | 7/2010 | Srinivasan et al. |
| 7,769,880 B2 | 8/2010 | Paka et al. |
| 7,783,772 B2 | 8/2010 | Klemets |
| 7,783,773 B2 | 8/2010 | Wu et al. |
| 7,797,720 B2 * | 9/2010 | Gopalakrishnan et al. ..... 725/88 |
| 7,809,851 B2 | 10/2010 | Klemets |
| 7,839,895 B2 | 11/2010 | Sullivan et al. |
| 7,860,996 B2 | 12/2010 | Musayev et al. |
| 7,873,040 B2 | 1/2011 | Karlsgodt |
| 2002/0012394 A1 | 1/2002 | Hatano et al. |
| 2002/0073084 A1 | 6/2002 | Kauffman et al. |
| 2002/0087634 A1 | 7/2002 | Ogle et al. |
| 2002/0114388 A1 | 8/2002 | Ueda |
| 2002/0118809 A1 | 8/2002 | Eisenberg |
| 2002/0122491 A1 | 9/2002 | Karczewicz et al. |
| 2002/0133547 A1 | 9/2002 | Lin et al. |
| 2002/0136406 A1 | 9/2002 | Fitzhardinge et al. |
| 2002/0138619 A1 | 9/2002 | Ramaley et al. |
| 2002/0143556 A1 | 10/2002 | Kadatch |
| 2002/0146102 A1 | 10/2002 | Lang |
| 2002/0154693 A1 | 10/2002 | Demos |
| 2002/0168066 A1 | 11/2002 | Li |
| 2002/0176624 A1 | 11/2002 | Kostrzewski et al. |
| 2002/0178138 A1 | 11/2002 | Ender et al. |
| 2002/0184391 A1 | 12/2002 | Phillips |
| 2002/0194608 A1 | 12/2002 | Goldhor |
| 2003/0007464 A1 | 1/2003 | Balani |
| 2003/0037103 A1 | 2/2003 | Salmi et al. |
| 2003/0055995 A1 | 3/2003 | Ala-Honkola |
| 2003/0061607 A1 | 3/2003 | Hunter et al. |
| 2003/0072370 A1 | 4/2003 | Girod et al. |
| 2003/0078972 A1 | 4/2003 | Tapissier et al. |
| 2003/0093530 A1 | 5/2003 | Syed |
| 2003/0110236 A1 | 6/2003 | Yang et al. |
| 2003/0113026 A1 | 6/2003 | Srinivasan et al. |
| 2003/0115041 A1 | 6/2003 | Chen |
| 2003/0115042 A1 | 6/2003 | Chen |
| 2003/0115050 A1 | 6/2003 | Chen |
| 2003/0115051 A1 | 6/2003 | Chen |
| 2003/0115052 A1 | 6/2003 | Chen |
| 2003/0125932 A1 | 7/2003 | Wang et al. |
| 2003/0172131 A1 | 9/2003 | Ao |
| 2003/0220972 A1 | 11/2003 | Montet et al. |
| 2003/0236905 A1 | 12/2003 | Choi et al. |
| 2003/0236906 A1 | 12/2003 | Klemets et al. |
| 2004/0042549 A1 | 3/2004 | Huang et al. |
| 2004/0098748 A1 | 5/2004 | Bo et al. |
| 2004/0117427 A1 | 6/2004 | Allen et al. |
| 2004/0131340 A1 | 7/2004 | Antoun et al. |
| 2004/0136457 A1 | 7/2004 | Funnell et al. |
| 2004/0141651 A1 | 7/2004 | Hara et al. |
| 2004/0172478 A1 | 9/2004 | Jacobs |
| 2004/0268397 A1 | 12/2004 | Dunbar et al. |
| 2005/0002453 A1 | 1/2005 | Chang et al. |
| 2005/0009520 A1 | 1/2005 | Herrero et al. |
| 2005/0015259 A1 | 1/2005 | Thumpudi et al. |
| 2005/0015528 A1 | 1/2005 | Du |
| 2005/0016363 A1 | 1/2005 | Puryear |
| 2005/0024487 A1 | 2/2005 | Chen |
| 2005/0036759 A1 | 2/2005 | Lin et al. |
| 2005/0047503 A1 | 3/2005 | Han et al. |
| 2005/0050152 A1 | 3/2005 | Penner et al. |
| 2005/0066063 A1 | 3/2005 | Grigorovitch et al. |
| 2005/0076039 A1 | 4/2005 | Ludwig et al. |

| | | |
|---|---|---|
| 2005/0076136 A1 | 4/2005 | Cho |
| 2005/0084015 A1 | 4/2005 | Han et al. |
| 2005/0084166 A1 | 4/2005 | Boneh et al. |
| 2005/0105815 A1 | 5/2005 | Zhang et al. |
| 2005/0117641 A1 | 6/2005 | Xu et al. |
| 2005/0123058 A1 | 6/2005 | Greenbaum |
| 2005/0135484 A1 | 6/2005 | Lee |
| 2005/0157784 A1 | 7/2005 | Tanizawa et al. |
| 2005/0204385 A1 | 9/2005 | Sull et al. |
| 2005/0207734 A1 | 9/2005 | Howell |
| 2005/0234731 A1 | 10/2005 | Sirivara et al. |
| 2005/0234858 A1 | 10/2005 | Torii et al. |
| 2005/0246384 A1 | 11/2005 | Foehr et al. |
| 2005/0254508 A1 | 11/2005 | Aksu et al. |
| 2005/0254584 A1 | 11/2005 | Kim et al. |
| 2005/0267994 A1 | 12/2005 | Wong et al. |
| 2006/0015637 A1 | 1/2006 | Chung |
| 2006/0026294 A1 | 2/2006 | Virdi |
| 2006/0029065 A1 | 2/2006 | Fellman |
| 2006/0047779 A1 | 3/2006 | Deshpande |
| 2006/0062302 A1 | 3/2006 | Yin et al. |
| 2006/0088094 A1 | 4/2006 | Cieplinski et al. |
| 2006/0126713 A1 | 6/2006 | Chou et al. |
| 2006/0136597 A1 | 6/2006 | Shabtai et al. |
| 2006/0156363 A1 | 7/2006 | Wu et al. |
| 2006/0165166 A1 | 7/2006 | Chou |
| 2006/0184697 A1 | 8/2006 | Virdi |
| 2006/0218264 A1 | 9/2006 | Ogawa et al. |
| 2006/0235883 A1 | 10/2006 | Krebs et al. |
| 2006/0242080 A1 | 10/2006 | Van Dyke et al. |
| 2006/0242315 A1 | 10/2006 | Nichols |
| 2006/0248570 A1 | 11/2006 | Witwer |
| 2006/0270404 A1 | 11/2006 | Tuohino et al. |
| 2006/0282540 A1 | 12/2006 | Tanimoto |
| 2006/0282566 A1 | 12/2006 | Virdi et al. |
| 2006/0288099 A1 | 12/2006 | Jefferson et al. |
| 2007/0006064 A1 | 1/2007 | Colle |
| 2007/0037599 A1 | 2/2007 | Tillet et al. |
| 2007/0038873 A1 | 2/2007 | Oliveira et al. |
| 2007/0058926 A1 | 3/2007 | Virdi |
| 2007/0078768 A1 | 4/2007 | Dawson |
| 2007/0081586 A1 | 4/2007 | Raveendran et al. |
| 2007/0083886 A1 | 4/2007 | Kauffman et al. |
| 2007/0097816 A1 | 5/2007 | Van Gassel |
| 2007/0100891 A1 | 5/2007 | Nee |
| 2007/0198931 A1* | 8/2007 | Ono et al. ............ 715/719 |
| 2007/0204321 A1 | 8/2007 | Shen et al. |
| 2007/0274383 A1 | 11/2007 | Yu et al. |
| 2007/0276954 A1 | 11/2007 | Chan et al. |
| 2008/0022005 A1 | 1/2008 | Wu et al. |
| 2008/0037954 A1 | 2/2008 | Lee |
| 2008/0046939 A1 | 2/2008 | Lu et al. |
| 2008/0060029 A1 | 3/2008 | Park et al. |
| 2008/0086570 A1 | 4/2008 | Dey et al. |
| 2008/0091838 A1 | 4/2008 | Miceli |
| 2008/0172441 A1 | 7/2008 | Speicher |
| 2008/0195743 A1 | 8/2008 | Brueck et al. |
| 2008/0195744 A1 | 8/2008 | Bowra |
| 2008/0195761 A1 | 8/2008 | Jabri et al. |
| 2008/0201386 A1 | 8/2008 | Maharajh et al. |
| 2008/0211901 A1 | 9/2008 | Civanlar et al. |
| 2008/0256085 A1 | 10/2008 | Lee et al. |
| 2008/0312923 A1 | 12/2008 | Crinon et al. |
| 2009/0006538 A1 | 1/2009 | Risney et al. |
| 2009/0043906 A1 | 2/2009 | Hurst et al. |
| 2009/0049186 A1 | 2/2009 | Agnihotri et al. |
| 2009/0055417 A1 | 2/2009 | Hannuksela |
| 2009/0076904 A1 | 3/2009 | Serena |
| 2009/0089401 A1 | 4/2009 | Zhang et al. |
| 2009/0132599 A1 | 5/2009 | Soroushian et al. |
| 2009/0132721 A1 | 5/2009 | Soroushian et al. |
| 2009/0254672 A1 | 10/2009 | Zhang |
| 2009/0279605 A1 | 11/2009 | Holcomb et al. |
| 2009/0282162 A1 | 11/2009 | Mehrotra et al. |
| 2009/0282475 A1 | 11/2009 | George et al. |
| 2009/0300145 A1 | 12/2009 | Musayev et al. |
| 2009/0300203 A1 | 12/2009 | Virdi et al. |
| 2009/0300204 A1 | 12/2009 | Zhang et al. |
| 2009/0319681 A1 | 12/2009 | Freelander et al. |
| 2009/0328124 A1 | 12/2009 | Khouzam et al. |
| 2010/0011119 A1 | 1/2010 | Knowlton et al. |
| 2010/0058061 A1 | 3/2010 | Folta et al. |
| 2010/0080290 A1 | 4/2010 | Mehrotra |
| 2010/0114921 A1 | 5/2010 | Bocharov et al. |
| 2010/0135636 A1 | 6/2010 | Zhang et al. |
| 2010/0158101 A1 | 6/2010 | Wu et al. |
| 2010/0180011 A1 | 7/2010 | Sood et al. |
| 2010/0189183 A1 | 7/2010 | Gu et al. |
| 2010/0191974 A1 | 7/2010 | Dubhashi et al. |
| 2010/0235472 A1 | 9/2010 | Sood et al. |
| 2010/0235528 A1 | 9/2010 | Bocharov et al. |

FOREIGN PATENT DOCUMENTS

| | | |
|---|---|---|
| JP | 62 213 494 | 9/1987 |
| JP | 6 078 298 | 3/1994 |
| JP | 10 056 644 | 2/1998 |
| JP | 2008-523687 | 7/2008 |
| WO | WO 00/36753 | 6/2000 |
| WO | WO 2007/058515 | 5/2007 |

OTHER PUBLICATIONS

Chavez et al., "Monitoring-Based Adaptive Overlay Streaming Media," printed from http://www.eecs.berkeley.edu/Programs/ugrad/superb/papers2003/Brian%20Chavez.pdf on Aug. 12, 2008.

Huang et al., "Adaptive Live Video Streaming by Priority Drop," Proceedings of the IEEE Conference on Advanced Video and Signal Based Surveillance, pp. 342-347, Jul. 21-22, 2003.

Qazzaz et al., "Providing Interactive Video on Demand Services in Distributed Architecture," 29th Proceedings of the Euromicro Conference, pp. 215-222, Sep. 1-6, 2003.

Reibman et al., "Video Quality Estimation for Internet Streaming," International World Wide Web Conference, pp. 1168-1169, 2005.

Srinivasan et al., "Windows Media Video 9: Overview and Applications," Signal Processing: Image Communication, vol. 19, pp. 851-875, Oct. 2004.

Zhang et al., "Seamless Bit-Stream Switching in Multirate-Based Video Streaming Systems," EURASIP Journal on Applied Signal Processing, vol. 2006, No. 18, p. 1-11, 2006.

U.S. Appl. No. 60/341,674, filed Dec. 17, 2001, Lee et al.

Advanced Television Systems Committee, "ATSC Standard: Digital Audio Compression (AC-3), Revision A," pp. 1-140 (Aug. 2001).

Aksoy, "Wireless Thin Client Optimization for Multimedia Applications," M.S. Thesis, 166 pp. (2000).

Barker et al., "Dynamic Programming Based Smoothing of VBR Video Traffic," 10 pp. (document marked Mar. 6, 2002).

Baron et al, "Coding the Audio Signal," *Digital Image and Audio Communications*, pp. 101-128 (1998).

Beerends, "Audio Quality Determination Based on Perceptual Measurement Techniques," *Applications of Digital Signal Processing to Audio and Acoustics*, Chapter 1, Ed. Mark Kahrs, Karlheinz Brandenburg, Kluwer Acad. Publ., pp. 1-38 (1998).

Caetano et al., "Rate Control Strategy for Embedded Wavelet Video Coders," *Electronic Letters*, pp. 1815-1817 (Oct. 14, 1999).

Cheung et al., "A Comparison of Scalar Quantization Strategies for Noisy Data Channel Data Transmission," *IEEE Transactions on Communications*, vol. 43, No. 2/3/4, pp. 738-742 (Apr. 1995).

Crisafulli et al., "Adaptive Quantization: Solution via Nonadaptive Linear Control," *IEEE Transactions on Communications*, vol. 41, pp. 741-748 (May 1993).

Dai, "Rate-Distortion Analysis and Traffic Modeling of Scalable Video Coders," Dissertation, Texas A&M University, 172 pp. (Dec. 2004).

Dalgic et al., "Characterization of Quality and Traffic for Various Video Encoding Schemes and Various Encoder Control Schemes," Technical Report No. CSL-TR-96-701 (Aug. 1996).

De Luca, "AN1090 Application Note: STA013 MPEG 2.5 Layer III Source Decoder," *STMicroelectronics*, 17 pp. (1999).

de Queiroz et al., "Time-Varying Lapped Transforms and Wavelet Packets," *IEEE Transactions on Signal Processing*, vol. 41, pp. 3293-3305 (1993).

"DivX Multi Standard Video Encoder," 2 pp. (Downloaded from the World Wide Web on Jan. 24, 2006).

Doering, "Low-Cost, High-Impact Video Production Techniques for Laboratory Instructional Materials," *ASEE/IEEE Frontiers in Education Conference*, Session F1C, pp. 14-18 (Oct. 2001.).

Dolby Laboratories, "AAC Technology," 4 pp. [Downloaded from the web site aac-audio.com on World Wide Web on Nov. 21, 2001].

Fraunhofer-Gesellschaft, "MPEG Audio Layer-3," 4 pp. [Downloaded from the World Wide Web on Oct. 24, 2001].

Fraunhofer-Gesellschaft, "MPEG-2 AAC," 3 pp. [Downloaded from the World Wide Web on Oct. 24, 2001].

Gibson et al, *Digital Compression for Multimedia*, Chapter 4, "Quantization," pp. 113-138 (1998).

Gibson et al., *Digital Compression for Multimedia*, Chapter 7, "Frequency Domain Coding," Morgan Kaufman Publishers, Inc., pp. iii., v-xi, and 227-262 (1998).

Gibson et al., *Digital Compression for Multimedia*, Chapter 8, "Frequency Domain Speech and Audio Coding Standards," Morgan Kaufman Publishers, Inc., pp. 263-290 (1998).

Gibson et al., *Digital Compression for Multimedia*, Chapter 11.4, "MPEG Audio," Morgan Kaufman Publishers, Inc., pp. 398-402 (1998).

Gibson et al., *Digital Compression for Multimedia*, Chapter 11.6.2-11.6.4, "More MPEG," Morgan Kaufman Publishers, Inc., pp. 415-416 (1998).

Gill et al., "Creating High-Quality Content with Microsoft Windows Media Encoder 7," 4 pp. (2000). [Downloaded from the World Wide Web on May 1, 2002.].

Girod et al., "Advances in channel-adaptive video streaming," *Wireless Communications and Mobile Computing*, 24 pp. (Sep. 2002).

Guo et al., "P2Cast: Peer-to-peer Patching Scheme for VoD Service," Proceedings of the 12th International Conference on World Wide Web, 2003, 9 pages.

Herley et al., "Tilings of the Time-Frequency Plane: Construction of Arbitrary Orthogonal Bases and Fast Tiling Algorithms," *IEEE Transactions on Signal Processing*, vol. 41, No. 12, pp. 3341-3359 (1993).

He et al., "A Unified Rate-Distortion Analysis Framework for Transform Coding," *IEEE Transactions on Circuits and Systems for Video Technology*, vol. 11, No. 12, pp. 1221-1236 (Dec. 2001).

Hsu et al., "Joint Selection of Source and Channel Rate for VBR Video Transmission Under ATM Policing Constraints," *IEEE Journal on Selected Areas in Communications*, vol. 15, No. 6, pp. 1016-1028 (Aug. 1997).

Huang et al., "Optimal Coding Rate Control of Scalable and Multi Bit Rate Streaming Media," Microsoft Research Technical Report, MSR-TR-2005-47, 26 pp. (Apr. 2005).

Huang et al., "Optimal Control of Multiple Bit Rates for Streaming Media," *Proc. Picture Coding Symposium*, 4 pp. (Dec. 2004).

International Search Report and Written Opinion dated Mar. 22, 2010, from Application No. PCT/US2009/054081, 9 pp.

ISO, "MPEG-4 Video Verification Model version 18.0," ISO/IEC JTC1/SC29/WG11 N3908, Pisa, pp. 1-10, 299-311 (Jan. 2001).

ISO/IEC, "Information Technology—Coding of Audio-Visual Objects: Visual, ISO/IEC 14496-2, Committee Draft," 330 pp. (1998).

ISO/IEC, "ISO/IEC 11172-2: Information Technology—Coding of Moving Pictures and Associatged Audio for Storage Medua at up to About 1.5 Mbit/s," 122 pp. (1993).

ISO/IEC 11172-3, Information Technology—Coding of Moving Pictures and Associated Audio for Digital Storage Media at Up to About 1.5 Mbit/s—Part 3 Audio, 154 pp, (1993).

ISO/IEC 13818-7, "Information Technology—Generic Coding of Moving Pictures and Associated Audio Information," Part 7: Advanced Audio Coding (AAC), pp. i-iv, 1-145 (1997).

ISO/IEC 13818-7, Technical Corrigendum 1, "Information Technology—Generic Coding of Moving Pictures and Associated Audio Information," Part 7: Advanced Audio Coding (AAC), Technical Corrigendum, pp. 1-22 (1997).

ITU-T, "ITU-T Recommendation H.261: Video Codec for Audiovisual Services at $p$ x 64 kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

ITU, Recommendation ITU-R BS 1115, Low Bit-Rate Audio Coding, 9 pp. (1994).

ITU, Recommendation ITU-R BS 1387, Method for Objective Measurements of Perceived Audio Quality, 89 pp. (1998).

Jafarkhani et al., "Entropy-Constrained Successively Refinable Scalar Quantization," *IEEE Data Compression Conference*, pp. 337-346 (Mar. 1997).

Jayant et al., *Digital Coding of Waveforms, Principles and Applications to Speech and Video*, Prentice Hall, pp. 428-445 (Mar. 1984).

Jenkac et al., "On Video Streaming over Variable Bit-rate and Wireless Channels," presented at Packet Video 2003, Nantes, France, Apr. 28-29, 2003, 11 pp.

Jesteadt et al., "Forward Masking as a Function of Frequency, Masker Level, and Signal Delay," *Journal of Acoustical Society of America*, vol. 71, pp. 950-962 (1982).

Johansen, "Rate-Distortion Optimization for Video Communication in Resource Constrained IP Networks," Thesis, Norwegian University of Science and Technology, 161 pp. (Dec. 2007).

Joint Video Team of ISO/IEC MPEG and ITU-T VCEG, "Committee Draft of Joint Video Specification (ITU-T Recommendation H.264, ISO/IEC 14496-10 AVC," 142 pp. (Aug. 2002).

Kalman et al., "Rate-Distortion Optimized Video Streaming with Adaptive Playout," Proc. Int'l Conf. on Image Processing, 4 pp (Jun. 2002).

Kammin et al., "Video multiplexing for the MPEG-2 VBR encoder using a deterministic method," *Second Int'l Conf. on Automated Production of Cross Media Content for Multi-Channel Distribution*, 8 pp. (Dec. 2006).

Kondoz, *Digital Speech: Coding for Low Bit Rate Communications Systems*, "Chapter 3.3: Linear Predictive Modeling of Speech Signals," and "Chapter 4: LPC Parameter Quantisation Using LSFs," John Wiley & Sons, pp. 42-53 and 79-97 (1994).

Li et al., "Optimal Linear Interpolation Coding for Server-Based Computing," *Proc. IEEE Int'l Conf. on Communications*, 5 pp. (Apr. 2002).

Lutfi, "Additivity of Simultaneous Masking," *Journal of Acoustic Society of America*, vol. 73, pp. 262-267 (1983).

Malvar, "Biorthogonal and Nonuniform Lapped Transforms for Transform Coding with Reduced Blocking and Ringing Artifacts," *IEEE Transactions on Signal Processing, Special Issue on Multirate Systems, Filter Banks, Wavelets, and Applications*, vol. 46, 29 pp. (1998).

Malvar, "Lapped Transforms for Efficient Transform/Subband Coding," *IEEE Transactions on Acoustics, Speech and Signal Processing*, vol. 38, No. 6, pp. 969-978 (1990).

Malvar, *Signal Processing with Lapped Transforms*, Artech House, Norwood, MA, pp. iv, vii-xi, 175-218, and 353-357 (1992).

Matthias, "An Overview of Microsoft Windows Media Screen Technology," 3 pp. (2000). [Downloaded from the World Wide Web on May 1, 2002.].

Mook, "Next-Gen Windows Media Player Leaks to the Web," *BetaNews*, 17 pp. (Jul. 19, 2002) [Downloaded from the World Wide Web on Aug. 8, 2003].

Naveen et al., "Subband Finite State Scalar Quantization," *IEEE Transactions on Image Processing*, vol. 5, No. 1, pp. 150-155 (Jan. 1996).

OPTICOM GmbH, "Objective Perceptual Measurement," 14 pp. [Downloaded from the World Wide Web on Oct. 24, 2001].

OPTX International, "OPTX Improves Technology-Based Training with ScreenWatch™ 3.0. Versatile Screen Capture Software Adds High Color and Live Webcast Support," 1 p., document marked Feb. 15, 2001 [Downloaded from the World Wide Web on Sep. 22, 2005.].

OPTX International, "OPTX International Marks One Year Anniversary of Screen Watch With Release of New 2.0 Version," 1 p. document marked May 16, 2000 [Downloaded from the World Wide Web on Sep. 22, 2005.].

OPTX International, "New ScreenWatch™ 4.0 Click and Stream™ Wizard From OPTX International Makes Workplace Communication Effortless," 1 p., document marked Sep. 24, 2001 [Downloaded from the World Wide Web on Sep. 22, 2005.].

Ortega et al., "Adaptive Scalar Quantization Without Side Information," *IEEE Transactions on Image Processing*, vol. 6, No. 5, pp. 665-676 (May 1997).
Ortega, "Optimal bit allocation under multiple rate constraints," *Proc. of the Data Compression Conf.*, 10 pp. (Apr. 1996).
Ortega et al., "Optimal Buffer-Constrained Source Quantization and Fast Approximations," *IEEE*, pp. 192-195 (May 1992).
Ortega et al., "Optimal Trellis-based Buffered Compression and Fast Approximation," *IEEE Transactions on Image Processing*, vol. 3, No. 1, pp. 26-40 (Jan. 1994).
Palmer et al., "Shared Desktop: A Collaborative Tool for Sharing 3-D Applications Among Different Window Systems," *Digital Tech. Journal*, vol. 9, No. 3, pp. 42-49 (1997).
Pao, "Encoding Stored Video for Streaming Applications," *IEEE Transactions on Circuits and Systems for Video Technology*, vol. 11, No. 2, pp. 199-209 (Feb. 2001).
Phamdo, "Speech Compression," 13 pp. [Downloaded from the World Wide Web on Nov. 25, 2001].
Printouts of FTP directories from http://ftp3.itu.ch, 8 pp. (downloaded from the World Wide Web on Sep. 20, 2005).
Ramchandran et al., "Bit Allocation for Dependent Quantization with Applications to MPEG Video Coders," *IEEE*, pp. v-381-v-384 (Apr. 1993).
Ratnakar et al., "RD-OPT: An Efficient Algorithm for Optimizing DCT Quantization Tables," *IEEE*, pp. 332-341 (Mar. 1995).
Reader, "History of MPEG Video Compression—Ver. 4.0," 99 pp. (document marked Dec. 16, 2003).
Reed et al., "Constrained Bit-Rate Control for Very Low Bit-Rate Streaming-Video Applications," *IEEE Transactions on Circuits and Systems for Video Technology*, vol. 11, No. 7, pp. 882-889 (Jul. 2001).
Reibman et al., "Constraints on Variable Bit-rate Video for ATM Networks," *IEEE Transactions on Circuits and Systems for Video Technology*, No. 4, pp. 361-372 (Dec. 1992).
Rexford et al., "Online Smoothing of Live, Variable-Bit-Rate Video," *IEEE*, pp. 235-243 (May 1997).
Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).
Ronda et al., "Rate Control and Bit Allocation for MPEG-4," *IEEE Transactions on Circuits and Systems for Video Technology*, pp. 1243-1258 (Dec. 1999).
Schaar-Mitrea et al., "Hybrid Compression of Video with Graphics in DTV Communications Systems," *IEEE Trans. on Consumer Electronics*, pp. 1007-1017 (2000).
Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).
Schulzrinne, "Operating System Issues for Continuous Media," *ACM Multimedia Systems*, vol. 4, No. 5, 13 pp. (Mar. 1996).
Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).
Sheu et al., "A Buffer Allocation Mechanism for VBR Video Playback," Communication Tech. Proc. 2000, WCC-ICCT 2000, vol. 2, pp. 1641-1644 (Aug. 2000).
Sidiropoulos, "Optimal Adaptive Scalar Quantization and Image Compression," *ICIP*, pp. 574-578 (Oct. 1998).
Sjoberg et al., "Run-length Coding of Skipped Macroblocks," ITU-T SG16/Q.6 VCEG-M57, pp. 1-5 (Apr. 2001).
Solari, *Digital Video and Audio Compression*, Title Page, Contents, "Chapter 8: Sound and Audio," McGraw-Hill, Inc., pp. iii, v-vi, and 187-211 (1997).
Srinivasan et al., "High-Quality Audio Compression Using an Adaptive Wavelet Packet Decomposition and Psychoacoustic Modeling," *IEEE Transactions on Signal Processing*, vol. 46, No. 4, pp. 1085-1093 (Apr. 1998).
Sullivan, "Optimal Entropy Constrained Scalar Quantization for Exponential and Laplacian Random Variables," *ICASSP*, pp. V-265-V-268 (Apr. 1994).
Sullivan et al., "Rate-Distortion Optimization for Video Compression," *IEEE Signal Processing Magazine*, pp. 74-90 (Nov. 1998).
Sullivan et al., "The H.264/AVC Advanced Video Coding Standard: Overview and Introduction to the Fidelity Range Extensions," 21 pp. (Aug. 2004).
Sun et al., "Seamless Switching of Scalable Video Bitstreams for Efficient Streaming," *IEEE Transactions on Multimedia*, vol. 6, No. 2, pp. 291-303 (Apr. 2004).
Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).
Techsmith Corporation, "Camtasia Feature of the Week: Quick Capture," 2 pp. [Downloaded from the World Wide Web on May 9, 2002; document dated Jan. 4, 2001].
Techsmith Corporation, "Camtasia Screen Recorder SDK DLL API User Guide," Version 1.0, 66 pp. (2001).
Techsmith Corporation, "Camtasia v.3.0.1—README.TXT," 19 pp. (Jan. 2002).
Techsmith Corporation, "Techsmith Camtasia Screen Recorder SDK," 2 pp. (2001).
Terhardt, "Calculating Virtual Pitch," *Hearing Research*, vol. 1, pp. 155-182 (1979).
Trushkin, "On the Design on an Optimal Quantizer," *IEEE Transactions on Information Theory*, vol. 39, No. 4, pp. 1180-1194 (Jul. 1993).
Tsang et al., "Fuzzy based rate control for real-time MPEG video," 12 pp. (Nov. 1998).
Vetro et al., "An Overview of MPEG-4 Object-Based Encoding Algorithms," *IEEE International Symposium on Information Technology*, pp. 366-369 (2001).
Vicars-Harris, "An Overview of Advanced Systems Format," 3 pp. (May 2003) [Downloaded from the World Wide Web on Mar. 16, 2004].
Walpole et al., "A Player for Adaptive MPEG Video Streaming over the Internet," *Proc. SPIE*, vol. 3240, pp. 270-281 (Mar. 1998).
Westerink et al., "Two-pass MPEG-2 Variable-bit-rate Encoding," *IBM J. Res. Develop.*, vol. 43, No. 4, pp. 471-488 (Jul. 1999).
Wong, "Progressively Adaptive Scalar Quantization," *ICIP*, pp. 357-360 (Sep. 1996).
Wragg et al., "An Optimised Software Solution for an ARM Powered™ MP3 Decoder," 9 pp. [Downloaded from the World Wide Web on Oct. 27, 2001].
Wu et al., "Entropy-Constrained Scalar Quantization and Minimum Entropy with Error Bound by Discrete Wavelet Transforms in Image Compression," *IEEE Transactions on Image Processing*, vol. 48, No. 4, pp. 1133-1143 (Apr. 2000).
Wu et al., "Joint estimation of forward and backward motion vectors for interpolative prediction of video," *IEEE Transactions on Image Processing*, vol. 3, No. 5, pp. 684-687 (Sep. 1994).
Wu et al., "Quantizer Monotonicities and Globally Optimally Scalar Quantizer Design," *IEEE Transactions on Information Theory*, vol. 39, No. 3, pp. 1049-1053 (May 1993).
Wu et al., "SMART: An Efficient, Scalable and Robust Streaming Video System," *EURASIP on Applied Signal Processing*, vol. 2, 39 pp. (Feb. 2004).
Yang et al., "Rate Control for Videophone Using Local Perceptual Cues," *IEEE Transactions on Circuits and Systems for Video Tech.*, vol. 15, No. 4, pp. 496-507 (Apr. 2005).
Zwicker et al., *Das Ohr als Nachrichtenempfanger*, Title Page, Table of Contents, "I: Schallschwingungen," Index, Hirzel-Verlag, Stuttgart, pp. iii, ix-xi, 1-26 and 231-232 (1967).
Zwicker, *Psychoakustik*, Title Page, Table of Contents, "Teil I: Einfuhrung," Index, Springer-Verlag, Berlin Heidelberg, New York, pp. ii, ix-xi, 1-30 and 157-162 (1982).
Hsu et al., "Rate Control for Robust Video Transmission over Burst-Error Wireless Channels," IEEE Journal on Selected Areas of Communication, vol. 17, No. 5, pp. 756-773 (May 1999).
Chang et al., "BubbleUp: Low Latency Fast-Scan for Media Servers," Fifth ACM International Conference on Multimedia 1997, Nov. 1997, 12 pages.
Microsoft TechNet, "Streaming Media Services Role," Jan. 2008, 3 pages.
Zheng et al., "Multimedia Over High Speed Networks: Reducing Network Requirements with Fast Buffer Fillup," IEEE GLOBECOM-98, Nov. 1998, 6 pages.

* cited by examiner

MEDIA STREAMING WITH ENHANCED SEEK OPERATION

CROSS-REFERENCE TO RELATED APPLICATIONS

This application claims the benefit of U.S. Provisional Patent Application No. 61/057,759, filed on May 30, 2008, and U.S. Provisional Patent Application No. 61/057,755, filed May 30, 2008. Both applications are hereby incorporated in their entirety.

BACKGROUND

With the increasing popularity of playing streaming audio and video over networks such as the Internet, there is a need for optimizing the data transferred from a server to a client such that the client's experience is maximized even if network conditions during playback are inconsistent. Optimizing the client's experience involves making encoding decisions such that the video can be transferred and reconstructed with a minimal number of errors.

The term "streaming" is typically used to indicate that the data representing the media is provided by a host computer over a network to a playback device (i.e., a media playback computer implemented as any of a variety of conventional computing devices, such as a desktop PC, a notebook or portable computer a cellular telephone or other wireless communication device, a personal digital assistant (PDA), a gaming console, etc.) The client computer typically renders the streaming content as it is received from the host, rather than waiting for the entire file to be delivered.

The quality level is generally dictated by the bit rate specified for the encoded audio or video portions of the input stream. A higher bit rate generally indicates that a larger amount of information about the original audio or video is encoded and retained, and therefore a more accurate reproduction of the original input audio or video can be presented during video playback. Conversely, a lower bit rate indicates that less information about the original input audio or video is encoded and retained, and thus a less accurate reproduction of the original audio or video will be presented during video playback.

Generally, the bit rate is specified for encoding each of the audio and video based on several factors. The first factor is the network condition between the server and the client. A network connection that can transfer a high amount of data indicates that a higher bit rate can be specified for the input video that is subsequently transferred over the network connection. The second factor is the desired start-up latency. Start-up latency is the delay that a video playback tool experiences when first starting up due to the large amount of data that has to be received, processed, and buffered. Start-up latency can also occur after a seek operation, where the user selects variable positions in the streaming content to view. A third factor is the processing capabilities of the playback device. The fourth factor is the tolerance to glitching. Glitching occurs when the content is not displayed at the rate it was authored causing the playback device to run out of data to display. In most cases any amount of start-up latency or glitching is intolerable, and it is therefore desirable to optimize the bit rate specified such that the start-up latency and the glitching are minimized or eliminated.

SUMMARY

The present disclosure relates to playback of video/audio streaming media data. The media stream is available from the network at multiple encoded bit rates. When a seek operation is performed, a playback device can request a lower bit rate media stream in order to quickly fill a playback buffer so that playback can commence more readily. After a seek start-up period is complete, the playback device can return to downloading the media stream encoded at higher bit rates in order to increase the quality of the playback.

The foregoing and other objects, features, and advantages of the invention will become more apparent from the following detailed description, which proceeds with reference to the accompanying figures.

DETAILED DESCRIPTION

As used in this application and in the claims, the singular forms "a," "an" and "the" include the plural forms unless the context clearly dictates otherwise. Additionally, the term "includes" means "comprises." Although the operations of some of the disclosed methods and apparatus are described in a particular, sequential order for convenient presentation, it should be understood that this manner of description encompasses rearrangement, unless a particular ordering is required by specific language set forth below. For example, operations described sequentially can in some cases be rearranged or performed concurrently.

Any of the methods described herein can be performed (at least in part) using software comprising computer-executable instructions stored on one or more computer-readable media. Furthermore, any intermediate or final results of the disclosed methods can be stored on one or more computer-readable media. It should be understood that the disclosed technology is not limited to any specific computer language, program, or computer. For instance, a wide variety of commercially available computer languages, programs, and computers can be used.

Figure 1:
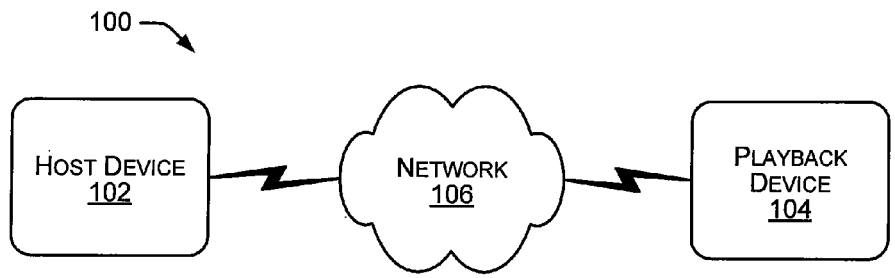
FIG. 1 illustrates an exemplary environment suitable for sending streaming media content over a network from a host device to a playback device.

FIG. 1 illustrates an exemplary environment 100 which can be suitable for transmitting media content being streamed over a network 106 from a host computer device 102 to a playback computer device 104. The network 106 can be any of a variety of conventional network topologies and types (including optical, wired and/or wireless networks), using a variety of conventional network protocols (including public and/or proprietary protocols). The network 106 can include, for example, a home network, a corporate network, or the Internet, as well as possibly at least portions of one or more local area networks (LANs) and/or wide area networks (WANs) or telephone networks.

A host device 102 generally stores media content and streams media content to the playback device 104. The playback device 104 can receive streaming media content via the network 106 from host device 102 and plays it for a user. Additionally, the playback device 102 can request a desired bit rate from the host device, which offers multiple bit rates to download. Host device 102 may be implemented as any of a variety of conventional computing devices, including, for example, a desktop PC, a notebook or portable computer, a workstation, an Internet appliance, and combinations thereof. Playback device 104 may also be implemented as any of a variety of conventional computing devices, including, for example, a desktop PC, a notebook or portable computer, a workstation, an Internet appliance, a gaming console, a handheld PC, a cellular telephone or other wireless communications device, a personal digital assistant (PDA), a set-top box, and combinations thereof.

Host device 102 can make any of a variety of data available for streaming to playback device 104, including content, such as audio, video, text, images, animation, and the like. However, as used herein with respect to the exemplary embodiments described below, media content is intended to represent audio/video (A/V) content or just video content. Furthermore, references made herein to "media content", "streaming media", "streaming video", "video content", and any variation thereof are generally intended to include audio/video content. The term "streaming" is used to indicate that the data representing the media content is provided over a network 106 to a playback device 104 and that playback of the content can begin prior to the content being delivered in its entirety.

Figure 2:
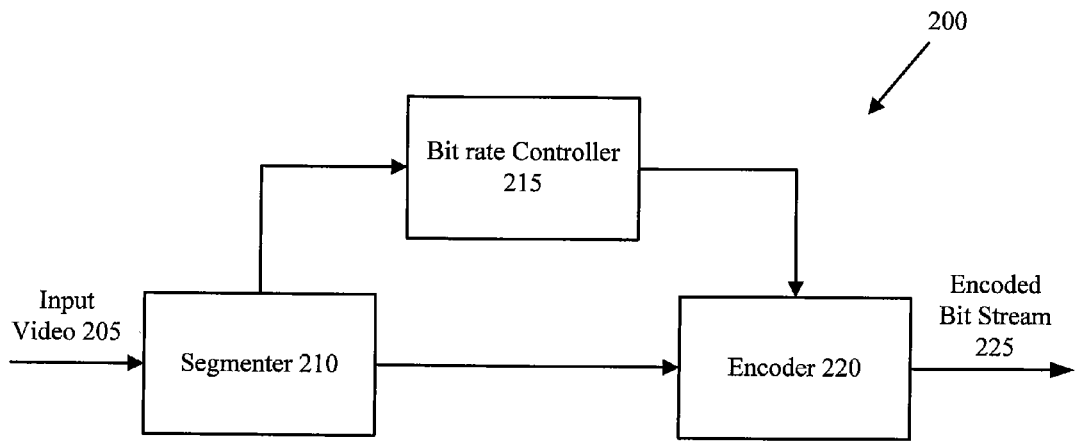
FIG. 2 illustrates an example encoder on the host device.

FIG. 2 illustrates an exemplary encoding tool 200 that can be implemented on the host device 102. The tool includes a segmenter 210 that accepts input video 205 and splits the input video into a plurality of segments each comprising a certain number of frames. Input video generally refers to a stream comprising both audio components and video components. In certain embodiments, the segments each comprise 60 frames. In other embodiments the segments can vary across a range of values such as comprising between 30 frames to 90 frames. The number of frames in the segment can be based on factors such as scene changes in the input video 205. For example, if a segment contains a scene change, the frames before the scene change could be drastically different than the frames after the scene change.

The segmenter 210 outputs the segments to a bit rate controller 215. The bit rate controller 215 analyzes each segment and selects bit rates for one or more bit rate layers for each of the segments. A bit rate layer is a layer comprising a specific bit rate used to encode the input video 205. The number of bit rate layers and their respective bit rates for each segment may be affected by factors associated with the segment such as the number of frames in the segment or the complexity of the input video 205 in the given segment. Additionally, the number of bit rate layers and their corresponding bit rates may be affected by factors not associated with the given segment such as limits on the size of the file or the maximum or minimum bandwidth of the network that the encoded input video 205 will be transferred through. In one embodiment, the bit rate controller 215 selects the bit rates for the bit rate layers for each of the segments independently from each of the other segments. Thus, a given segment may be encoded at the same or different bit rates as any other segment.

The segmenter 210 also outputs the segments to an encoder 220, and the bit rate controller 215 signals the bit rate layers for each segment to the encoder 220. The encoder 220 can encode according to a Windows Media Video or VC-1 format, MPEG-x format (e.g., MPEG-1, MPEG-2, or MPEG-4), H.26x format (e.g., H.261, H.262, H.263, or H.264), or other format. The encoder 220 may also be able to encode according to one or more audio standards such as WAV, FLAC, MP3, WMA, or some other standard. In some embodiments the encoder 220 encodes each segment as each bit rate layer and outputs a series of chunks in an encoded bit stream 225. Generally speaking, a chunk is a segment encoded as a particular bit rate layer. Thus, the encoder 220 can produce one or more chunks for each segment. In other embodiments, the encoder may encode the segment with less than all of the available bit rate layers. This may occur if, for example, a user defines a certain amount of time available for encoding, or conditions make certain bit rate layers un-necessary or undesirable.

As is well-understood in the art, the embodiment of FIG. 2 can be modified to encode a continuous media stream that is not divided into chunks. It is, however, desirable to be able to extract portions of the continuous media stream and to be able to logically define different portions of the media stream for extraction, if desired.

In certain embodiments, the encoding tool 200 may include a splitter (not shown) that splits the input video 205 into a separate video component and an audio component. In these embodiments, a separate segmenter, bit rate controller and encoder can be used to encode each of the video component and the audio component. The encoder for the video component can encode according to WMV or VC-1 format, MPEG-x format, H.26x format, or some other format. The encoder for the audio component can encode according to WAV, FLAC, MP3, WMA, or some other standard. Additionally, the segments for the video component and the segments for the audio component may be selected independently of each other. In this embodiment the segments of the video component may, but do not have to, comprise the same frames as the segments of the audio component.

Figure 3:
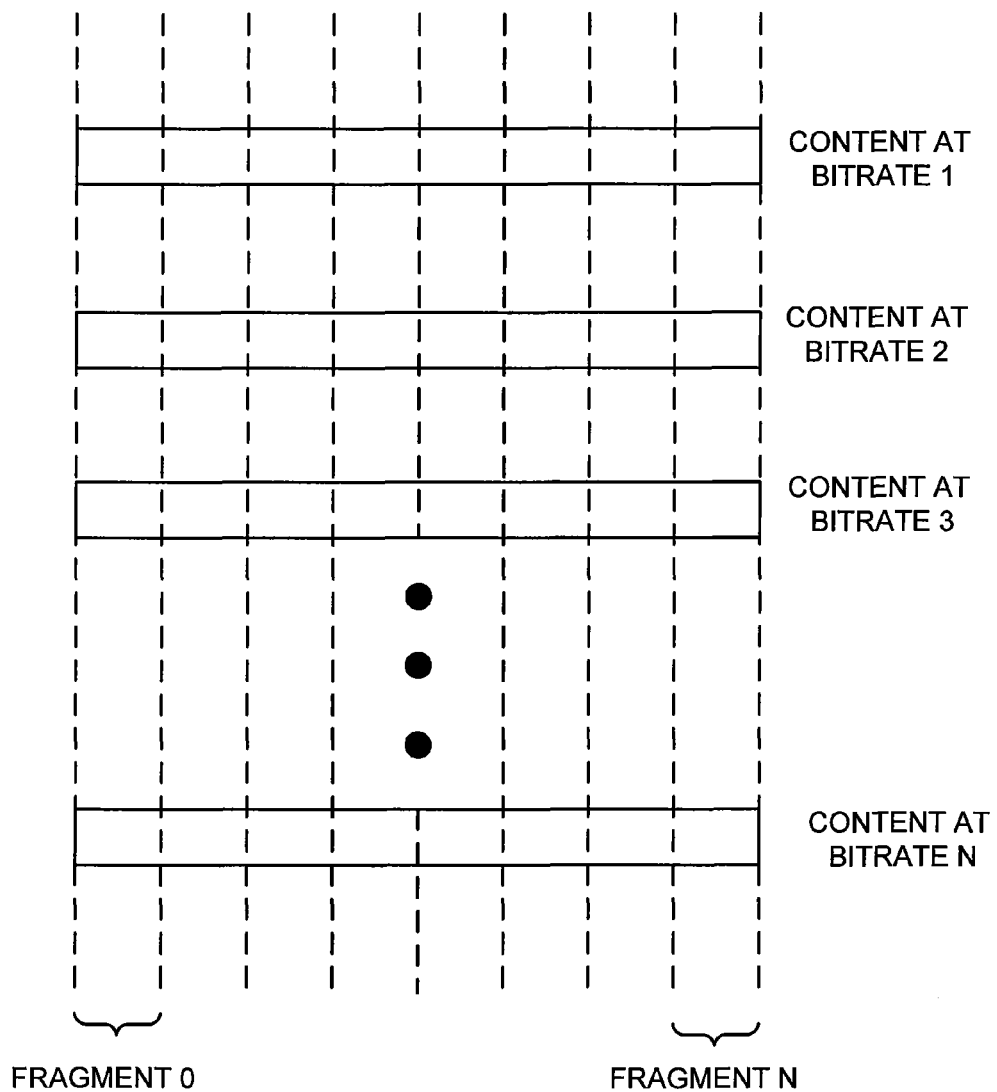
FIG. 3 illustrates an example media stream having multiple, fixed bit rates.

FIG. 3 shows multiple bit rates 1-N for particular content generated by the encoding tool of FIG. 2. The content is identical at each bit rate, but the quality increases with higher bit rates. In the illustrated example, there are N bit rates shown, where N could be any number. In particular embodiments, N is equal to 4. Additionally, the media streams can be divided into segments (also called fragments or chunks). The fragments may range from two to five seconds each in certain embodiments, although any duration may be used. A particular example includes video segments that are 2 seconds in length and audio segments are 5 seconds in length. In the example of FIG. 3, the bit rates are encoded at substantially constant rates (e.g., 1 kbps, 2 kbps, etc.).

Figure 4:
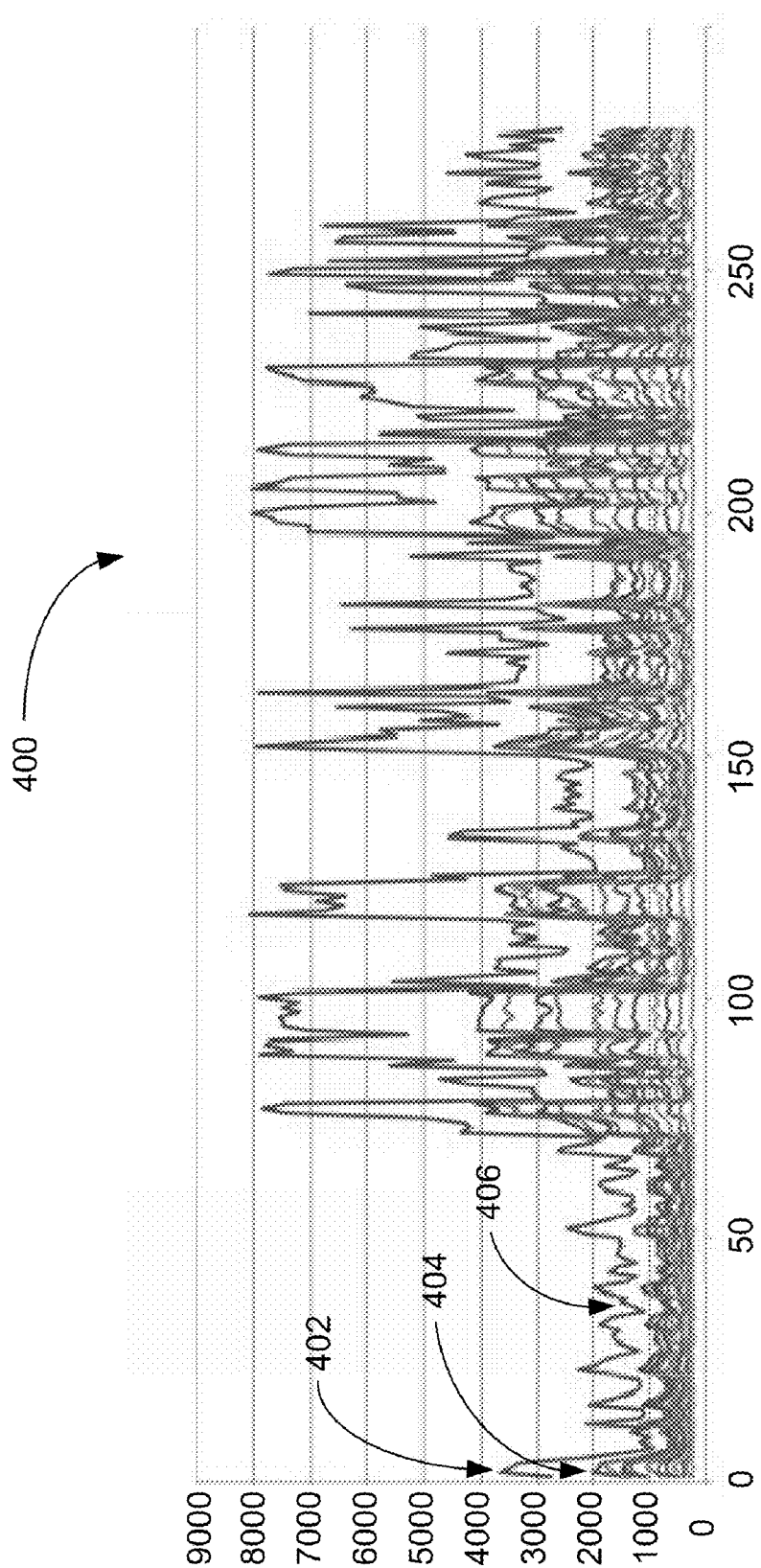
FIG. 4 illustrates an example media stream having multiple, variable bit rates.

FIG. 4 is an example of media streams encoded at variable bit rates 400 that may also be used with any of the embodiments described herein and that is generated by the encoding tool. Variable bit rates allocate a different amount of data to a scene based on complexity. Some scenes require a lower bit rate, such as dark scenes with low levels of movement. Other scenes, such as action scenes, require a higher bit rate because the scenes are more complex. A lower complexity scene can be seen between 0 and 50 seconds and has a small bit rate distribution between the media streams. The higher complexity scenes have a high amount of bit rate distribution as seen at about 100 seconds. In a case with such variance in the bit rates, although the bit rate of one media stream may, on average, be the highest, that media stream's bit rate may fall below the maximum bit rate for other media streams. For purposes of illustration, the bit rates are classified as index 1, 2, 3, . . . N. The bit rates for index 1 and 2 are shown at 402, 404, respectively. At a time shown at 406, the bit rate for index 1 is about 1050 bps. However, as can be seen at a time shown at 404, index 2 is about 2000 bps, which is a higher bit rate than index 1 at time 406. Thus, although index 1 is always higher than index 2 at any particular point of time, over the entire time period, index 2 can peak above values of index 1.

Figure 5:
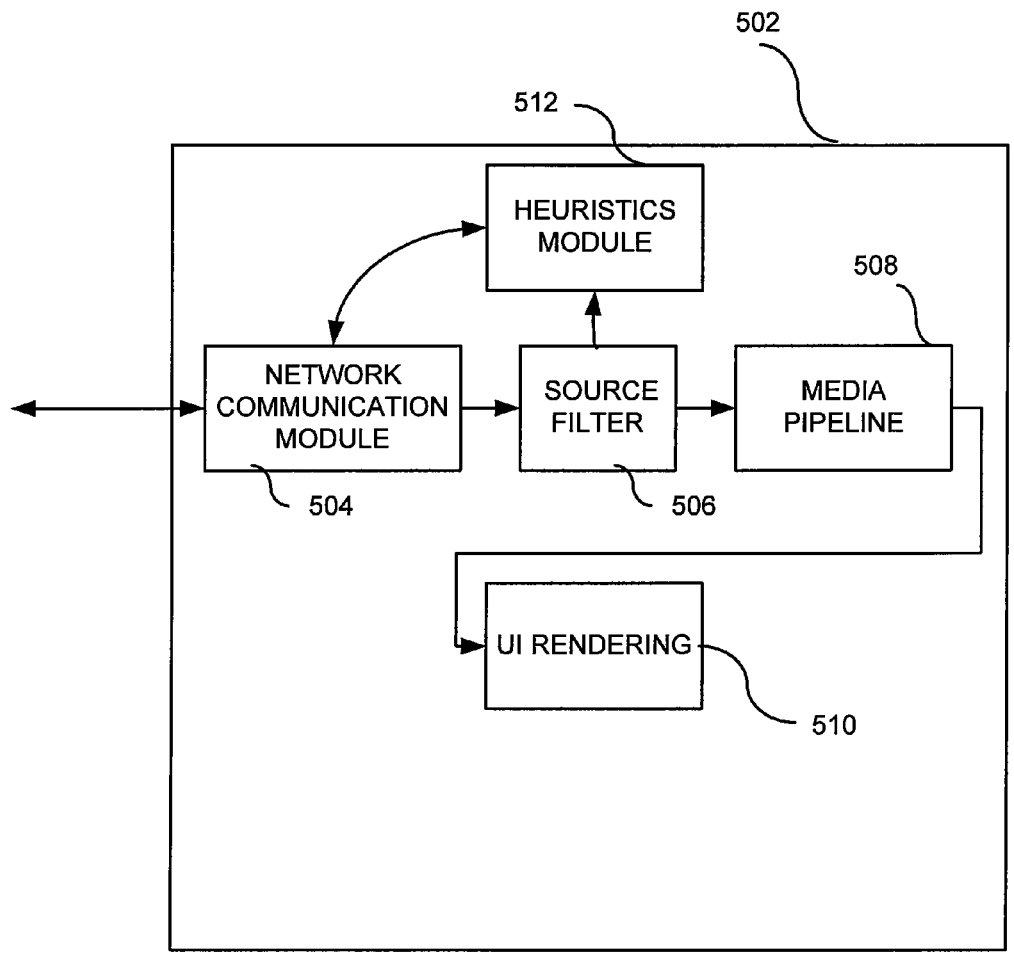
FIG. 5 illustrates an example application for rendering streaming media content on the playback device wherein a heuristics module is in the same application as a media pipeline.
Figure 8:
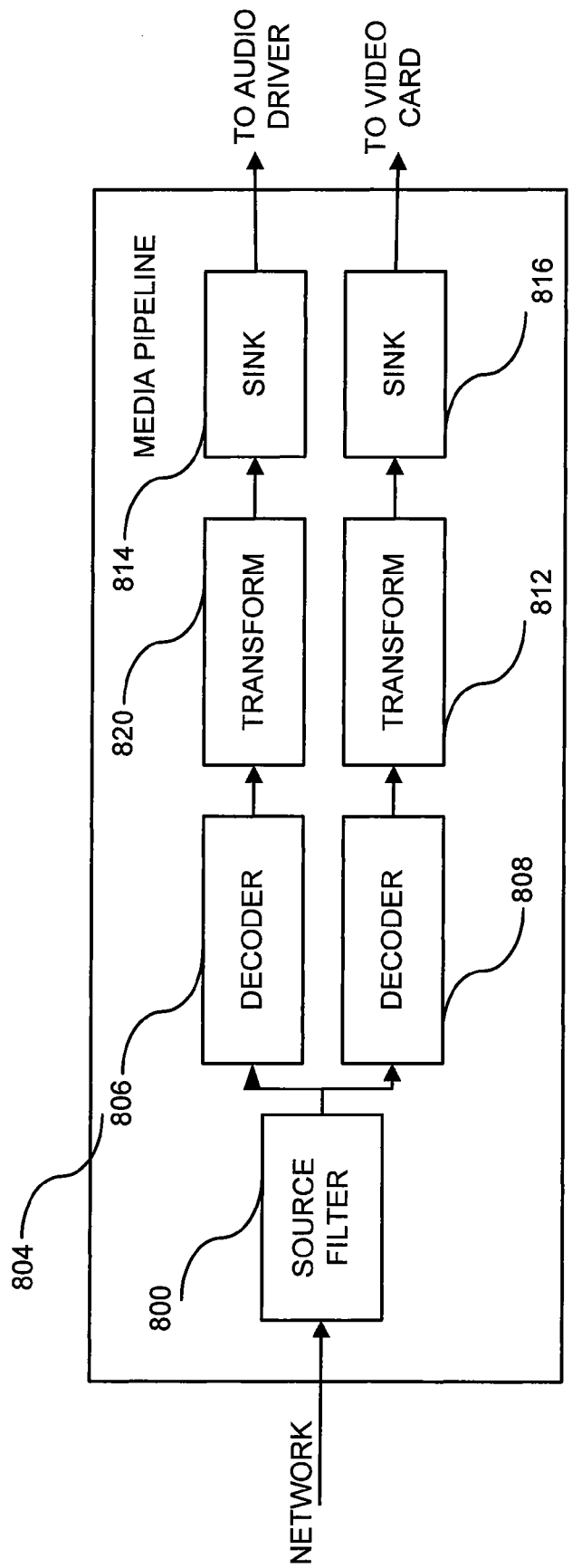
FIG. 8 illustrates an exemplary media pipeline on the playback device.

FIG. 5 illustrates an application 502 loaded on a playback device for rendering content. The application 502 may be run on any desired playback device that renders a media stream, such as a gaming console, a cellular phone, a personal digital assistant, in a browser on a computer, etc. The application can include a network communication module 504, a source filter 506, a media pipeline 508, a UI rendering module 510, and a heuristics module 512. The network communication module 504 generally includes software to communicate with a network server from which the media content is streamed. Thus, it is a downloader to obtain the media stream from the network. One example network communication module includes software for implementing a hypertext transfer protocol when communicating with a Web server. Other well-known protocols can be used depending on the playback device. The network communications module chooses an appropriate bitrate of a media stream as directed by the heuristics module. The source filter 506 can be coupled to the network communication module in order to receive audio and video content from the network. The source filter extracts the core media data (by parsing the file, if necessary) and splits the audio and video into two streams for use by the media pipeline. An example media pipeline 508 is shown in FIG. 8 and is described more fully below. The source filter 506 can be included in the media pipeline or separated there from. In any event, the media pipeline decodes the audio and video streams and provides the decoded streams to the UI rendering module 510 for display. Alternatively, the media pipeline 508 can be coupled to a storage device (not shown) that persistently stores the uncompressed data stream. Any variety of media pipelines may be used. The heuristics module 512 monitors the network (via the network communication module 504) and the media pipeline 508 to make intelligent decisions about which bit rate to request from the server in order to minimize glitches that are rendered on the playback device. The heuristics module also can select appropriate bit rates related to a seek operation. As described more fully below, when a seek operation is requested, the heuristics module 512 can direct the network communication module 504 to download a media stream encoded at a low bit rate in order to ensure the fastest possible start-up of rendering. After the start-up period is over, the heuristics module can direct that media streams encoded at higher bit rates are downloaded in order to increase the quality of the playback.

Figure 6:
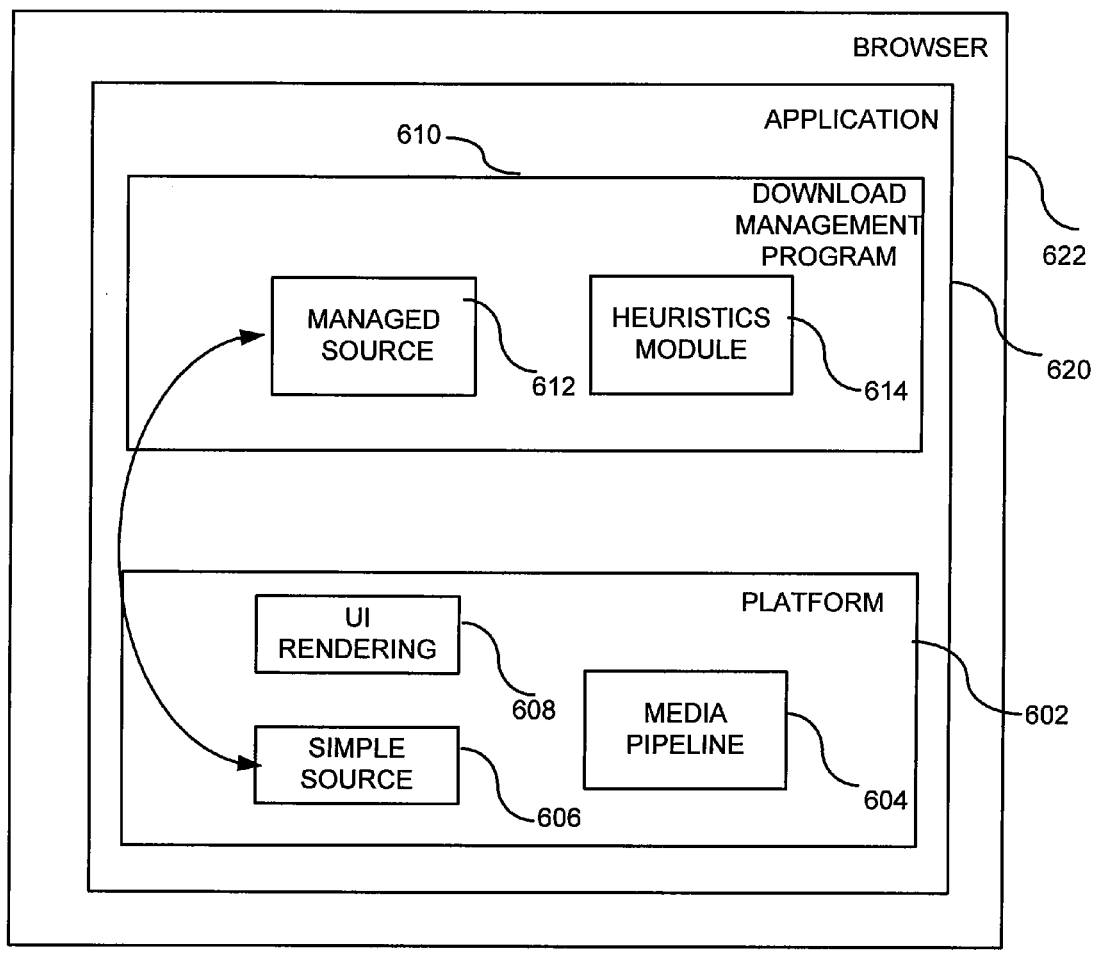
FIG. 6 illustrates an example application for rendering streaming media content on the playback device wherein the media pipeline is in a platform and the heuristics module is in a downloadable (e.g., plug-in) program.

FIG. 6 illustrates another possible environment used to render content on the playback device 104. The lowest layer (not shown) is an operating system executing on the playback device. A platform 602 is an executable file that is downloaded one time from a web server and remains resident on the playback device 104. The platform 602 includes a media pipeline 604 that is explained further below in FIG. 8, a simple source module 606, and a UI rendering module 608 used to render the media stream. A download management program 610 is typically downloaded each time a website is accessed and includes a managed source 612 and a heuristics module 614, which include the intelligence to make decisions about a desired bit rate to download from the host device 102. The purpose of the simple source 606 is to communicate with the managed source 612. Both the managed source 612 and the heuristics module 614 are described further below. The download management program 610 and platform 602 are part of an application 620 that is loaded in a browser 622.

Figure 7:
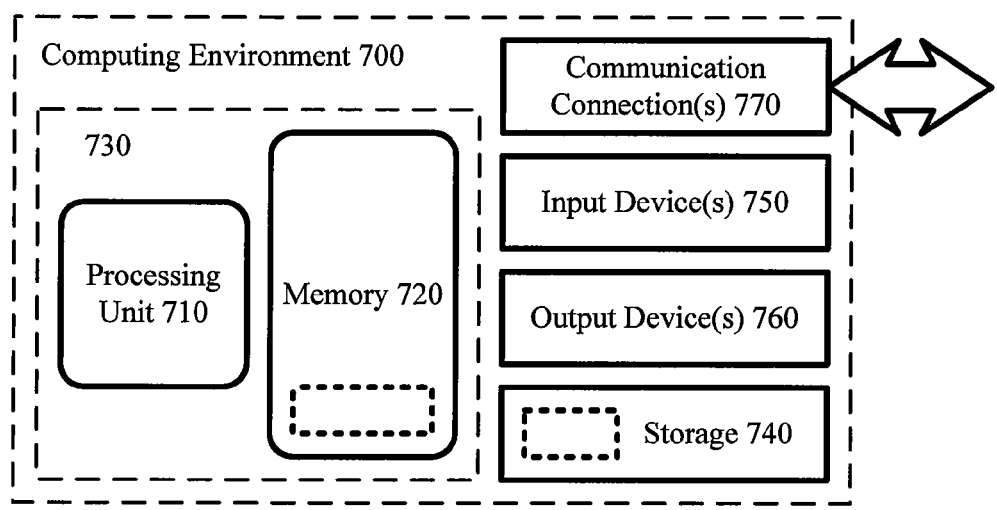
FIG. 7 illustrates an exemplary computing environment.

FIG. 7 illustrates a generalized example of a suitable computing environment 700 in which several of the described embodiments may be implemented. The computing environment 700 is not intended to suggest any limitation as to scope of use or functionality, as the techniques and tools may be implemented in diverse general-purpose or special-purpose computing environments.

With reference to FIG. 7, the computing environment 700 includes at least one processing unit 710 and memory 720. Similar computing devices may be used as either the host device 102 or the playback device 104. This most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other medium which can be used to store information and which can be accessed within the computing environment 700. The storage 740 stores instructions for the software 780 implementing the video encoder and/or decoder.

The input device(s) 750 may be a touch input device such as a keyboard, mouse, pen, or trackball, a voice input device, a scanning device, or another device that provides input to the computing environment 700. The input device(s) 750 may be a sound card, video card, TV tuner card, or similar device that accepts audio or video input in analog or digital form, or a CD-ROM or CD-RW that reads audio or video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "produce" and "encode" to describe computer operations in a computing environment. These terms are high-level abstractions for operations performed by a computer, and should not be confused with acts performed by a human being. The actual computer operations corresponding to these terms vary depending on implementation. Generally, the computing environment 700 can be used as the playback device 104.

FIG. 8 shows an example of the media pipeline 804 in more detail. The illustrated media pipeline is only an example of a possible media pipeline that can be used. In this example, a source filter 800 is included in the media pipeline and is coupled to the network to receive audio and video content from the network. The source filter can extract the core media data (by parsing the file, if necessary) and can split the audio and video into two streams. Two decoders 806, 808 can be used to decompress the encoded audio and video, respectively. Two transform modules 810, 812 can transform the decompressed audio and video signals. The transform operations can include a variety of operations, such as changing color space, changing scale, adding special effects, etc. Finally, sinks 814, 816 can be used to transmit the content to the audio and video drivers, respectively.

Figure 9:
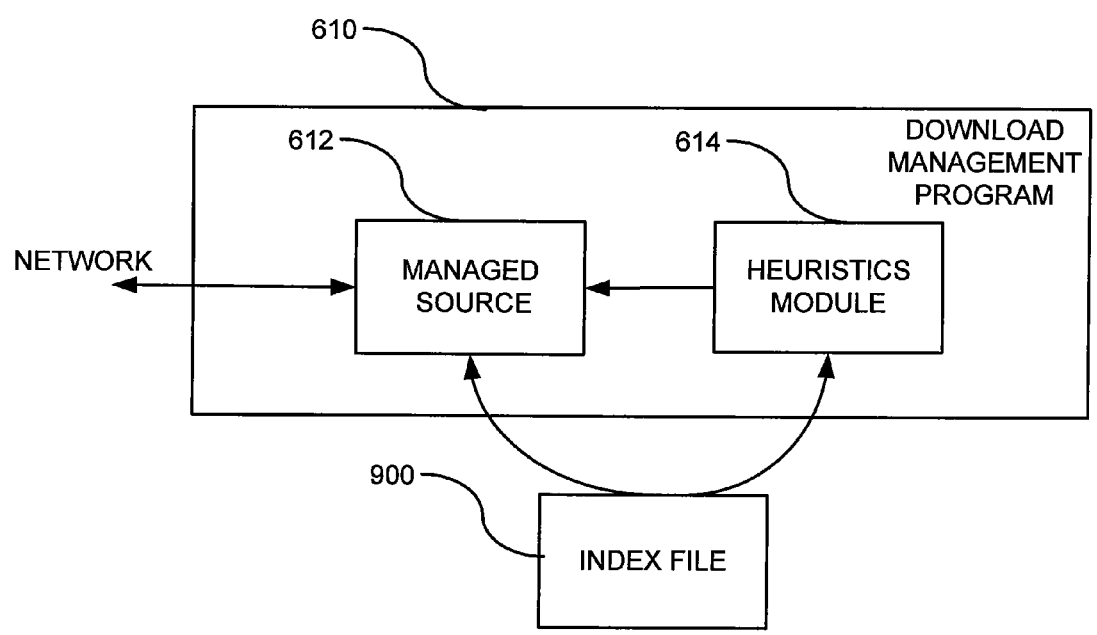
FIG. 9 illustrates a detailed view of a downloadable program coupled to a network.

FIG. 9 shows an example of the download management program 610 in more detail. An index file 900 is provided by the host and generally describes the different bit rates for the media streams that are available from the network and an address (e.g., URL) where to obtain the source content. In general, the managed source 612 reads data from the network (e.g., Internet), parses the index file 900 that describes the content, parses the file received from the network (e.g., remove header information), communicates with the heuristics module 614 about which bit rate to download next, and maintains an input buffer. The heuristics module 614 instructs the managed source 612 which bit rate to pull next based on empirical data, such as one or more of the following:

1) current and historic bandwidth levels;
2) current and historic buffer levels; and
3) capabilities of the playback device.

An example index file can have separate sections for video and audio and describe the different bit rates that are available to pull from the host. It also can include the URLs, the duration of the content segments, quality information, the size of the files, the number of content segments, position in time of the content segments, the media attributes, etc. In sum, the index file includes information about the time-varying properties of the encoded media streams. An example index file is as follows:

```
manifest
<MediaIndex MajorVersion="0" MinorVersion="1">
  <Attribute Name="XCP_MS_UINT64_DURATION" Value="30"/>
  <StreamIndex
    Type = "video"
    Subtype = "WVC1"
    Chunks = "15"
    Url = "{1}/chunk_{1}_{0}.vid"
  >
    <Bitrate Kbps = "200"/>
    <Bitrate Kbps = "700"/>
    <Bitrate Kbps = "1500"/>
    <Attribute Name="XCP_MS_UINT32_4CC" Value="WVC1"/>
    <Attribute Name="XCP_MS_UINT32_WIDTH" Value="720"/>
    <Attribute Name="XCP_MS_UINT32_HEIGHT" Value="480"/>
    <Attribute Name="XCP_MS_BLOB_VIDEO_CODEC"
Value="270000010FCBEE1670EF8A16783BF180C9089CC4AFA11C0000010E1207F840"/>
    <c n="0" d="20020000"/><c n="1" d="20020000"/><c n="2" d="20020000"/><c
n="3" d="20020000"/><c n="4" d="20020000"/><c n="5" d="20020000"/><c n="6"
d="20020000"/><c n="7" d="20020000"/><c n="8" d="20020000"/><c n="9" d="20020000"/>
    <c n="10" d="20020000"/><c n="11" d="20020000"/><c n="12" d="20020000"/><c
n="13" d="20020000"/><c n="14" d="20020000"/>
  </StreamIndex>
  <StreamIndex
    Type = "audio"
    Subtype = "WMA"
    Chunks = "15"
    Url = "audio/chunk_{1}_{0}.aud"
    Language="en-us"
  >
    <Bitrate Kbps = "700"/>
    <Attribute Name="XCP_MS_BLOB_WAVEFORMATEX"
Value="6101020044AC0000853E00009D0B10000A00008800000F0000000000"/>
    <c n="0" d="20630000"/><c n="1" d="20810000"/><c n="2" d="19390000"/><c
```

-continued

```
n="3" d="20430000"/><c n="4" d="18800000"/><c n="5" d="20210000"/><c n="6"
d="20440000"/><c n="7" d="19500000"/><c n="8" d="21370000"/><c n="9" d="19040000"/>
  <c n="10" d="19960000"/><c n="11" d="20610000"/><c n="12" d="18870000"/><c
n="13" d="21360000"/><c n="14" d="19510000"/>
</StreamIndex>
</MediaIndex>
```

The content is divided into segments (called chunks) that are generally 2-5 seconds each. The chunks are available at multiple bit rates. As already discussed, the chunks may be physically divided segments or virtually divided segments (in the case of a continuous stream). After a predetermined period of time, the quality and bit rate are reevaluated to ensure a glitch-free display of the media stream.

The designation of "bit rates" refers to the bit rates available for the media stream. The "attribute" names can provide information used by the decoder in the media pipeline in order to decode the media stream. One example is that the attributes can be initialization information for the decoder. There can be different sections in the index file for "video" and "audio", so that the chunks are described independently for each. The designation of "n=" refers to a chunk number. The chunks can be numbered sequentially. The designation of "d=" following each chunk number refers to the duration of the chunk. As can be seen, the chunks are of varying duration but are approximately equal in length. Other characteristics of the media stream can easily be inserted into the index file, such as the size of files associated with the chunks or the duration of the entire media segment. An additional characteristic is also resolution that can be useful to proper rendering. The illustrated index file is only an example and not all of the data elements described need to be used. Indeed, one or more of any of the data elements can be used.

Another example index file is as follows:

This index file includes additional information about each chunk. As already described above, "n" is the chunk number and "d" is the duration of the chunk. Additional information can include a designation "s=", which is a size of each chunk. The "q" designation represents each chunk's average quality. The average quality of a chunk can be calculated during encoding. In the particular example shown, the higher quality number generally means less information is lost due to video compression. As described further below, the heuristics module makes a determination based on a number of factors, such as empirical data of the playback, which bit rate to choose. Quality levels can also be considered into the decision. For example, quality information allows intelligent decisions about accepting lower bit rates for low quality content in order to reserve bandwidth for higher bit rates for high quality content. For example, low bit rates can be used for dark scenes that have little motion (where high quality might not necessarily be visually different than low quality) in favor of using high bit rates for scenes that are complex with a lot of motion.

Any of the described index files can be represented as an XML file with the specific schema, potentially, with a simple encoding to hide clear text. It can contain media level attributes (e.g. total playback duration), and description of individual streams. Stream descriptions can include media stream-specific information, such as type of the stream (e.g. video, audio), encoding and other codec information (e.g. fourCC code, width, height), available bitrates, and informa-

```
<MediaIndex MajorVersion="0" MinorVersion="3">
<Attribute Name="XCP_MS_UINT64_DURATION_HNS" Value="1169500000"/>
<StreamIndex Type="Video" SubType="WVC1"
Url="mbr/JennaEasyHD_1280x720_30fps_{1}_{0}.vid" Chunks="62" Bitrates="12">
<Bitrate n="0" Kbps="3960" w="1280" h="720"/>
<Bitrate n="1" Kbps="2083" w="1280" h="720"/>
<Bitrate n="2" Kbps="1813" w="1280" h="720"/>
<Bitrate n="3" Kbps="1564" w="1280" h="720"/>
<Bitrate n="4" Kbps="1396" w="1280" h="720"/>
<Bitrate n="5" Kbps="1140" w="1280" h="720"/>
<Bitrate n="6" Kbps="925" w="600" h="400"/>
<Bitrate n="7" Kbps="781" w="600" h="400"/>
<Bitrate n="8" Kbps="597" w="600" h="400"/>
<Bitrate n="9" Kbps="455" w="600" h="400"/>
<Bitrate n="10" Kbps="349" w="600" h="400"/>
<Bitrate n="11" Kbps="249" w="600" h="400"/>
<Attribute Name="XCP_MS_UINT32_4CC" Value="WVC1"/>
<Attribute Name="XCP_MS_UINT32_WIDTH" Value="1280"/>
<Attribute Name="XCP_MS_UINT32_HEIGHT" Value="720"/>
<Attribute Name="XCP_MS_BLOB_VIDEO_CODEC"
Value="250000010fd3fe27f1678a27f859f180c8800000010e5a0040"/>
<c n="0" d="20020000"><f n="0" s="839" q="4930"/><f n="1" s="413" q="2421"/><f n="2"
s="367" q="2148"/><f n="3" s="322" q="1885"/><f n="4" s="290" q="1696"/><f n="5"
s="232" q="1355"/><f n="6" s="184" q="1076"/><f n="7" s="164" q="953"/><f n="8"
s="124" q="721"/><f n="9" s="99" q="575"/><f n="10" s="79" q="454"/><f n="11" s="58"
q="334"/></c>
<c n="1" d="22020000"><f n="0" s="837" q="4761"/><f n="1" s="435" q="2469"/><f n="2"
s="397" q="2255"/><f n="3" s="342" q="1941"/><f n="4" s="308" q="1748"/><f n="5"
s="251" q="1422"/><f n="6" s="194" q="1099"/><f n="7" s="168" q="946"/><f n="8"
s="130" q="731"/><f n="9" s="108" q="605"/><f n="10" s="88" q="494"/><f n="11" s="65"
q="359"/></c>
``` tion on individual media segments represented by chunks of different available bitrates (e.g. segment duration, chunk sizes). Also, the stream description can include information that allows production of individual chunks URLs for download, which is normally a text pattern that includes calculated fields based on chunk number, chunk bitrate, chunk stream and stream type.

Figure 10:
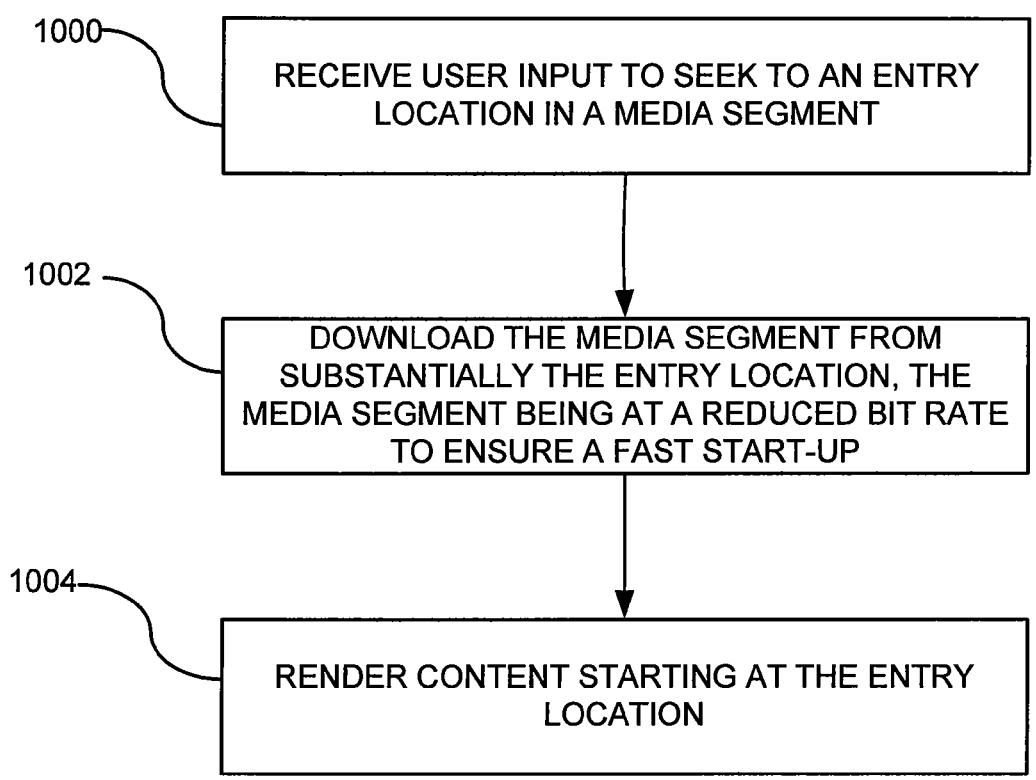
FIG. 10 is a flowchart of a method to ensure fast start-up after a seek operation.

FIG. 10 is a flowchart of a method for seeking in a media stream. In process block 1000, the playback device 104 receives user input to seek to an entry location in a media stream. A typical user input is to drag a location indicator to a new position along a time line. For example, media segments may be viewed on the Internet that include an indicator showing the current position of a video presentation and how much of the presentation remains. The indicator may be dragged along the time line to a new position. Such a drag-and-drop operation results in a seek starting from the new location. Other types of user input for a seek operation may also be used, as is well understood in the art. In process block 1002, the media stream is downloaded substantially at the new location. However, a lower bit rate version of the media stream is used to ensure fast start-up. Generally, a bit rate is used that is lower than the user's network bandwidth can sustain in order to maximize speed of start-up, rather than quality. For example, the lowest bit rate available can be used to ensure that the playback buffer fills quickly. By filling the buffer quickly, the media stream is rendered at a faster speed, albeit quality is sacrificed. Additionally, the location can be a starting point of the nearest fragment or chunk. It may also be possible (if the stream is continuous) to start the media segment at the actual location in time corresponding to the position indicator. In process block 1004, the media stream is rendered starting at the new location or as close to the new location as is possible.

Figure 11:
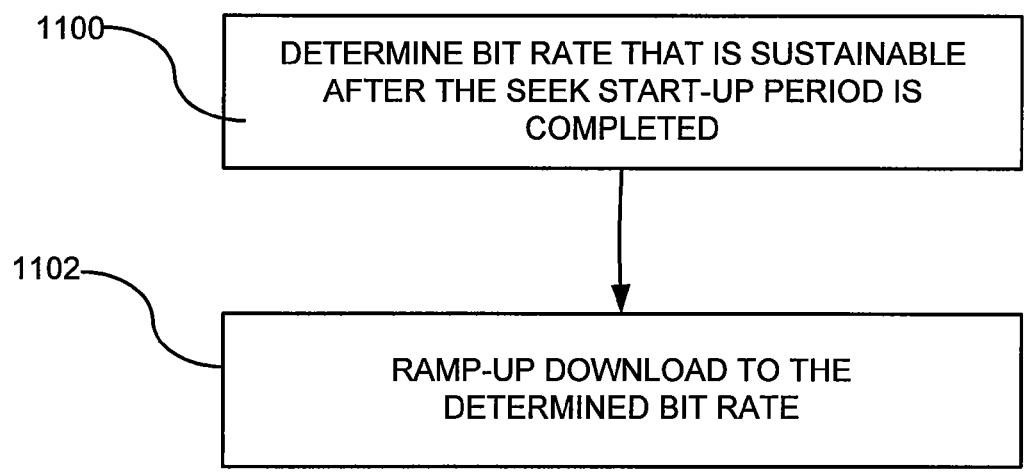
FIG. 11 is a flowchart of a method for fast ramp-up of a bit rate after a seek operation.

FIG. 11 is a flowchart of a method showing another aspect of the seek operation. In process block 1100, a determination of a sustainable bit rate is made after the seek start-up period is completed. The seek start-up period can be any desired duration. For example, the start-up period can be a predetermined time period (e.g., 2, 3, 4 seconds, etc.) or it can be a certain number of chunks that are downloaded (1, 2, 3, 4, etc.). Generally, the heuristics module determines the sustainable bit rate based on historical information, etc., as already described. In process block 1102, the bit rate is ramped up or changed to the determined bit rate. More particularly, the media stream encoded with the determined bit rate is downloaded from the server. Thus, after a seek operation, the bit rate of the media stream rendered is temporarily reduced in order to have fast start up. After the start-up period, the media stream returns to higher bit rates to render with the highest sustainable quality. As a result, the playback device renders the media stream encoded at a first bit rate and then after a seek operation renders a media stream encoded at a lower, second bit rate, and then after a predetermined period of time after the seek, the playback device renders the media stream encoded at a higher, third bit rate that can be equal to the first bit rate or another bit rate as determined by the heuristics module.

Using a chunking scheme works well with a seek operation. For example, where each chunk has a duration of 2 seconds, if the user wants to seek to the 30th second into the content, the playback device only needs to start downloading the 15th chunk into the stream. Alternatively, the index file can be used to determine the proper location. For example, the index file can allow calculation of a chunk number associated with a selected location in the media stream. In any event, the index file can be used in cooperation with the heuristics module to convert the user seek request into a request from the server to download the media segment from a desired point.

Figure 12:
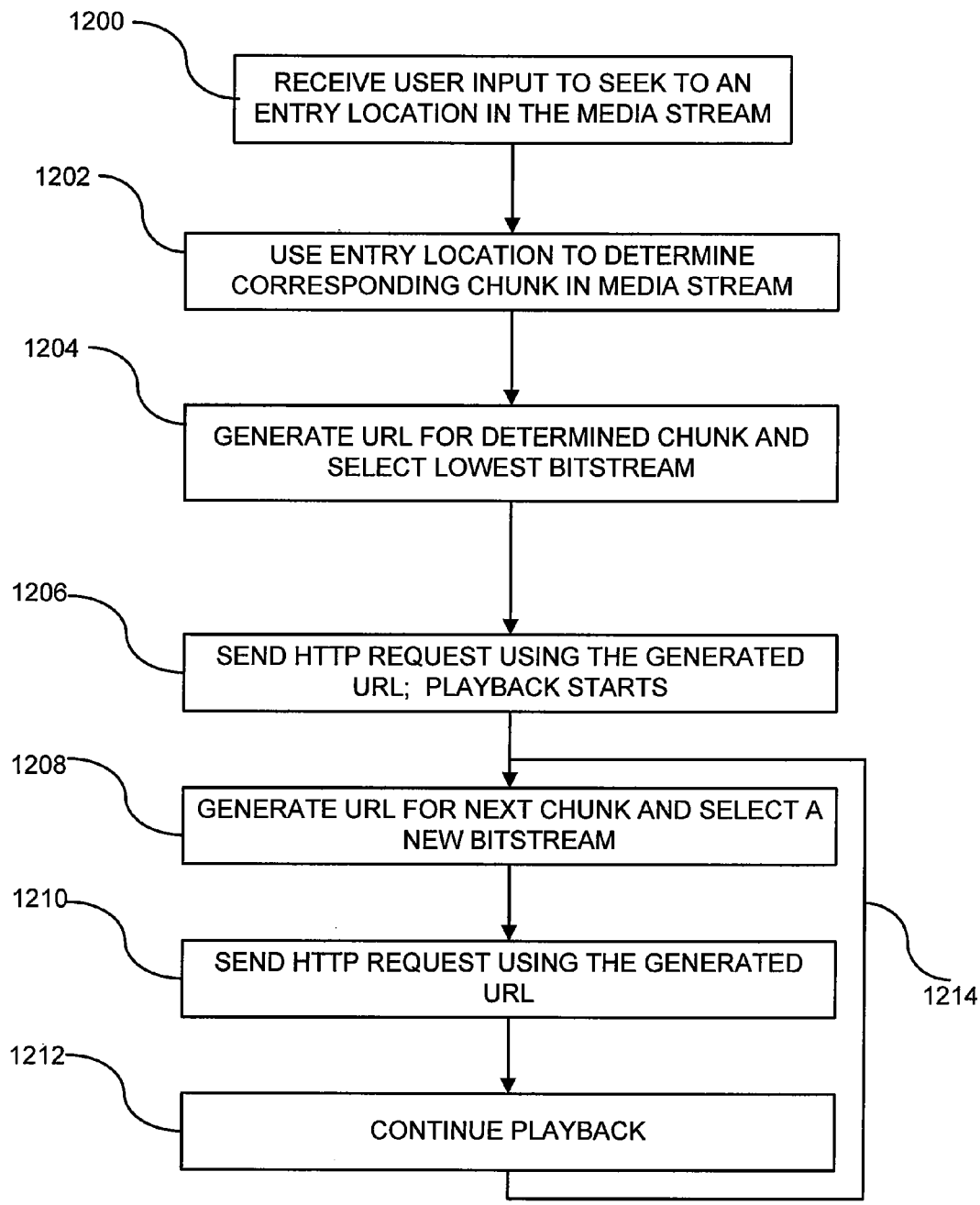
FIG. 12 is a detailed flowchart of a method for implementing playback after a seek operation.

FIG. 12 is a detailed flowchart of a method for implementing a playback after a seek operation. In process block 1200, the playback device receives user input to seek to an entry location in a media stream. In process block 1202, the entry location is used to determine a chunk number in the media stream. For example, if the entry location is 60 seconds and the chunks are 2 seconds each, then the chunk number associated with the entry location is 30. The timing can be determined using the index file described above. In process block 1204, an address (e.g., URL) associated with the chunk is determined. The address can also be determined using the index file. Additionally, the lowest bit rate associated with the media stream is selected in order to fill the playback buffer as quickly as possible to ensure fast playback. In process block 1206, a network request (e.g., HTTP request) is made using the generated network address. The playback is then initiated using the media segment encoded at a low bit rate. For example, if the media stream is encoded at 1, 2, 3, and 4 kbps, the heuristics module can select 1 kbps after a seek operation, even if this is below the network and playback device's ability to download and render. In process block 1208, a next address is generated for the subsequent chunk to be displayed. A determination is made by the heuristics module whether to elect a higher bit rate or maintain the current bit rate. If the start-up period is complete, and the playback buffer substantially full, the heuristics module can elect to increase the bit rate in order to maximize quality. For example, the heuristics module can decide to download a media stream encoded at a bit rate of 3 or 4 kbps. In process block 1210, the new address and bit rate is used to request a next chunk (i.e., fragment) from the network. In process block 1212, the playback continues and a loop is performed as shown at 1214 until the playback is completed. If another seek operation occurs, the flowchart starts again at process block 1200.

Figure 13:
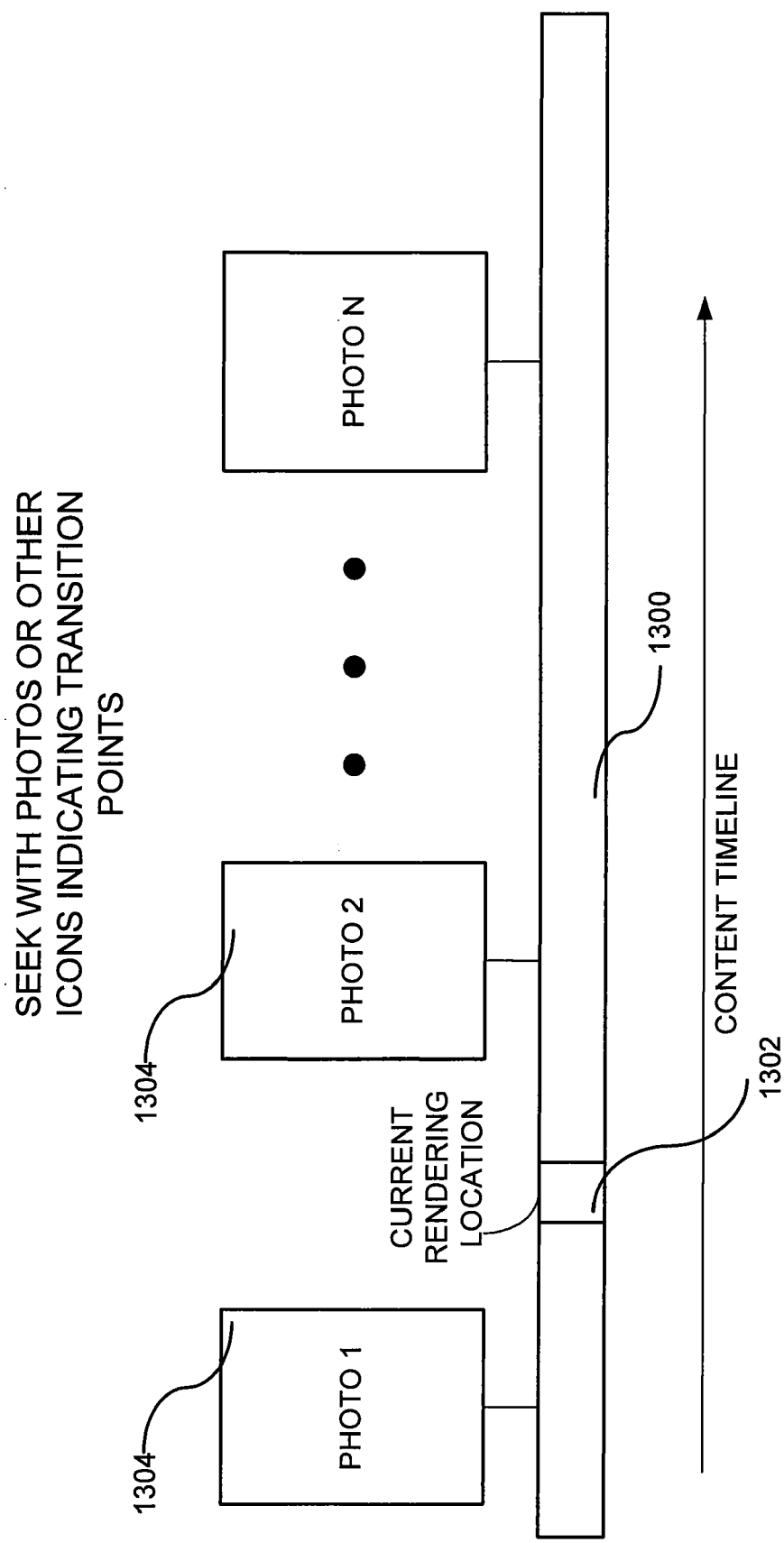
FIG. 13 illustrates using thumbnails in cooperation with a seek operation.

FIG. 13 is a user interface diagram showing a seek line 1300 with a current location indicator 1302 that indicates the current location of the content relative to the total duration. Multiple thumbnail photos 1304 are shown along the seek line to indicate actual or logical entry points into the content. The index file can include the information about where to place the thumbnail photos as the encoder generally knows where the scene changes are located. Thus, a user drags the current rendering location indicator 1302 to the desired point and drops to start viewing the content at the new location. Such a drag-and-drop operation causes a seek operation to occur.

Any of the examples described herein are only for purposes of illustration. For example, the example bit rates provided can easily be modified to whatever bit rates work on the system and allow for appropriate rendering of a media stream on a playback device.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method for performing a seek operation in a media stream displayed on a playback device, comprising:
   receiving a media stream from a network, the media stream being associated with a first bit rate and including a plurality of fragments;

receiving a user request to seek to a new location in the media stream;

using the new location to determine a corresponding network address of one of the plurality of fragments in the media stream;

in response to the user request, downloading the media stream, associated with a second bit rate that is less than the first bit rate, from substantially the new location to ensure fast start-up by using the network address in the media stream, wherein the content of the media stream is identical at the first and second bit rates, but quality increases with higher bit rates;

rendering the media stream starting at the new location; and ramping-up the bit rate of the media stream after the fast start-up based on a previously stored network bandwidth.

2. The method of claim 1, wherein the media stream is available from a server computer coupled to the playback device at multiple bit rates.

3. The method of claim 1, further including displaying an indicator of a current point in the media segment being displayed and displaying thumbnail photos as seek points that can be selected.

4. The method of claim 1, wherein the media stream is divided into the plurality of fragments of substantially equal time duration.

5. The method of claim 1, further including generating a network address for the new location using an index file associated with the media stream.

6. The method of claim 1, wherein the media stream includes multiple logical or actual entry points.

7. The method of claim 1, wherein the playback device includes one of the following: a computer, a mobile phone, a gaming console, and a television; and wherein the network is the Internet.

8. The method of claim 1, wherein the first and second bit rates for the media stream are at substantially constant bit rates or variable bit rates.

9. A method for performing a seek operation, comprising:

receiving a media segment, associated with a first bit rate, from a network;

displaying the media segment including a location indicator showing a current time point being viewed in the media segment;

receiving a request to view the media segment from a second time point that is different than the current time point;

using the second time point to determine one of a plurality of fragments in the media segment associated with the second time point;

receiving the media segment starting with the determine one of the plurality of fragments in the media segment, associated with a second bit rate that is lower than the first bit rate, the media segment at the second bit rate including a same content as the media segment at the first bit rate from the network for rendering from the second time point to ensure fast start-up for viewing the media segment; and returning to receiving the media segment associated with the first bit rate from the network after the start-up is completed.

10. The method of claim 9, wherein the request to view the media segment from the second time point is in response to a user drag-and-drop operation on the location indicator.

11. The method of claim 9, wherein the network is the Internet.

12. The method of claim 9, wherein the media segment is divided into the plurality of fragments; and further including switching to a higher bit rate after the fragment associated with the second time point is received.

13. A method for performing a seek operation, comprising:

receiving a media segment to display from a network, wherein the media segment comprises at least multiple sequential media fragments encoded at a first bit rate;

displaying the media segment by displaying the fragments sequentially in association with a location indicator showing a current point being viewed in the media segment;

receiving a seek request to view the media segment from a second, different point;

generating a network address associated with the second point;

requesting, from a server computer, a next fragment in the media segment that is encoded at a second bit rate, different than the first bit rate, the next fragment being at the generated network address and continuing to receive fragments at the second bit rate for a start-up period; and after the start-up period, returning to receiving the fragments associated with the media segment that are encoded at the first bit rate or another bit rate higher than the second bit rate.

14. The method of claim 13, wherein generating the network address includes using an index file that associates location in the media segment to time to generate a fragment number.

15. The method of claim 13, wherein a heuristics module determines which bit rate to download from the network.

16. The method of claim 15, wherein the heuristics module is in a plug-in to a browser.

17. The method of claim 13, wherein the media segment is available on the network at multiple bit rates and the bit rates are constant or variable.

18. The method of claim 13, further including displaying the location indicator with thumbnails representing points that can be jumped to in the media segment.

* * * * *